US012631871B2

(12) United States Patent
Mochida

(10) Patent No.: US 12,631,871 B2
(45) Date of Patent: May 19, 2026

(54) CONTROL SYSTEM, OPTICAL DEFLECTION APPARATUS, IMAGE PROJECTION APPARATUS, MOBILE OBJECT, AND HEAD-MOUNTED DISPLAY

(71) Applicant: Akitoshi Mochida, Osaka (JP)

(72) Inventor: Akitoshi Mochida, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 335 days.

(21) Appl. No.: 18/220,826

(22) Filed: Jul. 12, 2023

(65) Prior Publication Data

US 2024/0019689 A1 Jan. 18, 2024

(30) Foreign Application Priority Data

Jul. 15, 2022 (JP) ................................ 2022-114251

(51) Int. Cl.
*G02B 27/01* (2006.01)
*G02B 26/08* (2006.01)
*G02B 26/10* (2006.01)

(52) U.S. Cl.
CPC ....... *G02B 26/0858* (2013.01); *G02B 26/101* (2013.01); *G02B 27/0101* (2013.01); *G02B 27/0172* (2013.01); *G02B 2027/0178* (2013.01)

(58) Field of Classification Search
CPC ................................................ G02B 26/0858
USPC ..................................................... 359/199.4
See application file for complete search history.

(56) References Cited

U.S. PATENT DOCUMENTS

| | | | | |
|---|---|---|---|---|
| 9,291,817 B2 * | 3/2016 | Hashiguchi | ........ | G02B 26/0858 |
| 10,429,638 B2 * | 10/2019 | Hashiguchi | ........ | G02B 26/0858 |
| 2013/0083378 A1 * | 4/2013 | Tanaka | ................ | G02B 26/105 |
| | | | | 359/199.4 |
| 2013/0258432 A1 * | 10/2013 | Aimono | ............... | G02B 26/105 |
| | | | | 359/200.8 |
| 2015/0077823 A1 * | 3/2015 | Hashiguchi | .......... | H04N 9/3135 |
| | | | | 359/200.8 |

(Continued)

FOREIGN PATENT DOCUMENTS

| | | |
|---|---|---|
| JP | 2015-158614 | 9/2015 |
| JP | 2019-191227 | 10/2019 |

(Continued)

*Primary Examiner* — Ricky L Mack
*Assistant Examiner* — Elizabeth M Hall
(74) *Attorney, Agent, or Firm* — XSENSUS LLP

(57) ABSTRACT

A control system includes a movable device, memory, and circuitry. The movable device includes a reflector; paired movable portion; and a detector to detect deflection angle of the reflector. The circuitry outputs drive signals to the paired movable portions, respectively; generates the drive signals based on variables of a symmetry of each of the drive signals and a phase difference between the drive signals; detects, from the movable device, the deflection angle of the reflector by the detector; extract an amplitude of a high-frequency component from a detection signal; store, in the memory, information in which the amplitude of the high-frequency component is associated with values of the variables of the drive signals; select a combination of the values of the variables based on the high-frequency component and the information stored in the memory; and update the drive signals based on the combination of the values of the variables selected.

20 Claims, 25 Drawing Sheets

(56)         References Cited

U.S. PATENT DOCUMENTS

2017/0269352 A1\*    9/2017  Hashiguchi .......... G03B 21/008
2020/0201028 A1      6/2020  Mochida et al.
2020/0371345 A1     11/2020  Mochida

FOREIGN PATENT DOCUMENTS

JP        2020-101589      7/2020
JP        2020-101590      7/2020
JP        2021-148992      9/2021

\* cited by examiner

FIG. 2

FIG. 3
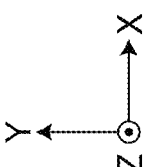
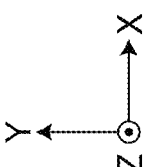

FIG. 11A

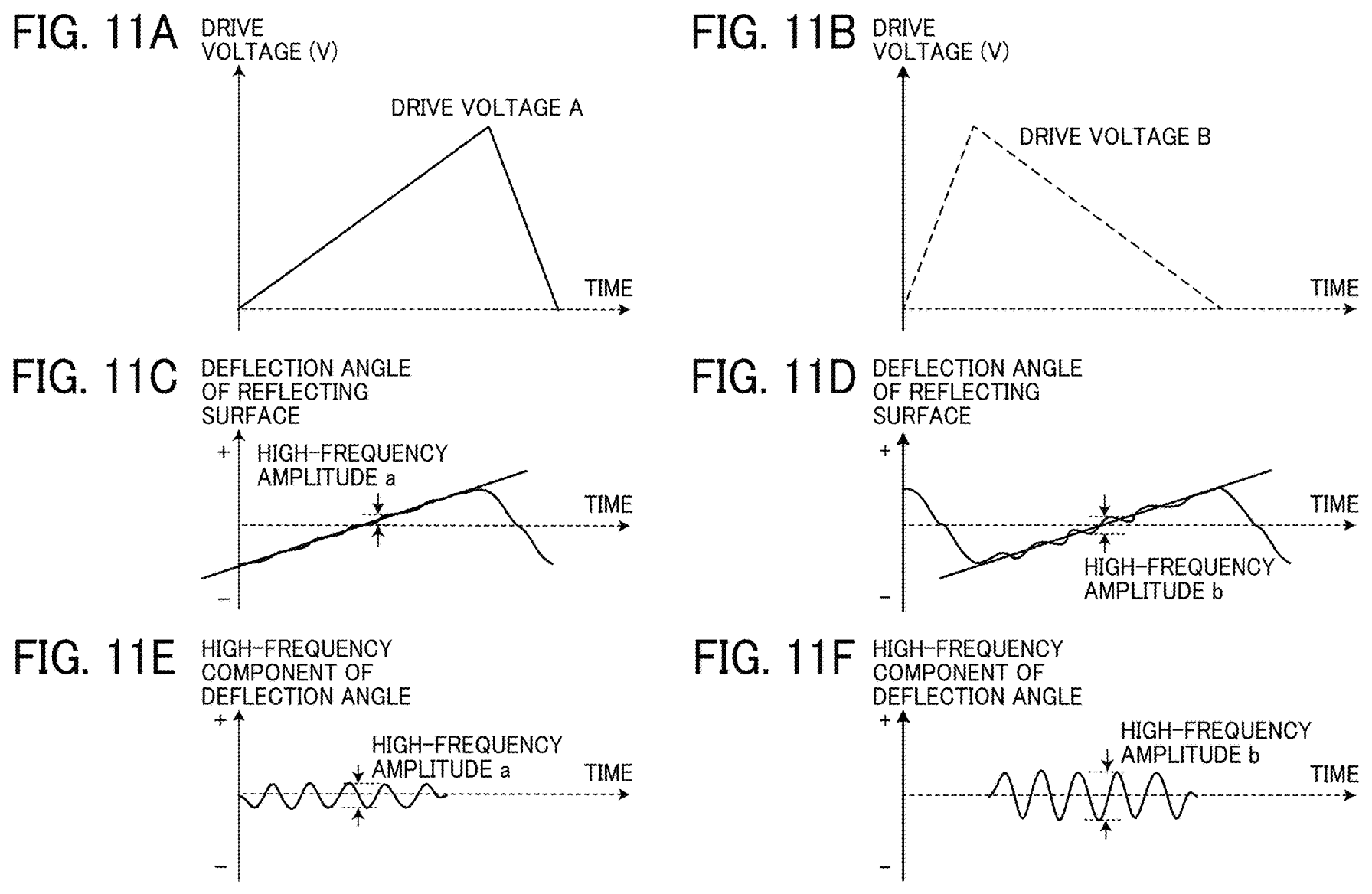

DRIVE VOLTAGE (V)

DRIVE VOLTAGE A

TIME

FIG. 11B

DRIVE VOLTAGE (V)

DRIVE VOLTAGE B

TIME

FIG. 11C

DEFLECTION ANGLE OF REFLECTING SURFACE

HIGH-FREQUENCY AMPLITUDE a

TIME

FIG. 11D

DEFLECTION ANGLE OF REFLECTING SURFACE

HIGH-FREQUENCY AMPLITUDE b

TIME

FIG. 11E

HIGH-FREQUENCY COMPONENT OF DEFLECTION ANGLE

HIGH-FREQUENCY AMPLITUDE a

TIME

FIG. 11F

HIGH-FREQUENCY COMPONENT OF DEFLECTION ANGLE

HIGH-FREQUENCY AMPLITUDE b

TIME

FIG. 13A
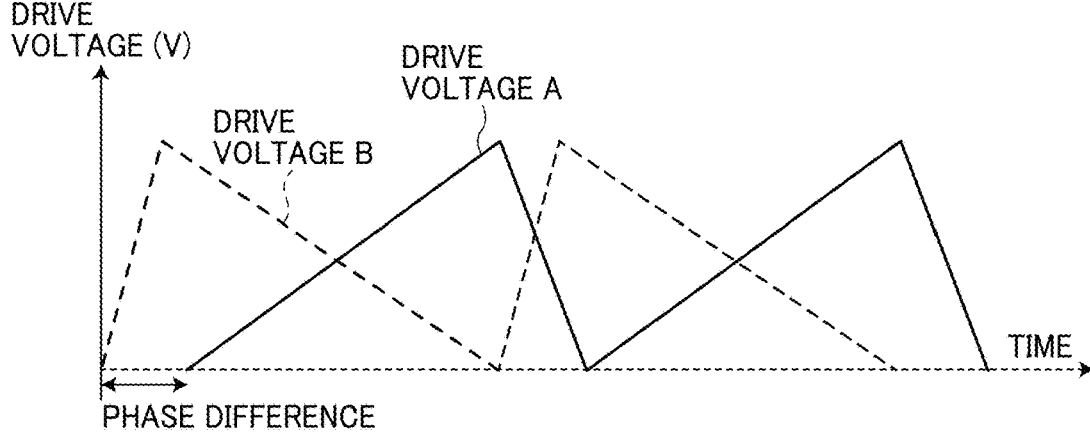
FIG. 13B
DRIVE VOLTAGE A
HIGH-FREQUENCY COMPONENT
OF DEFLECTION ANGLE
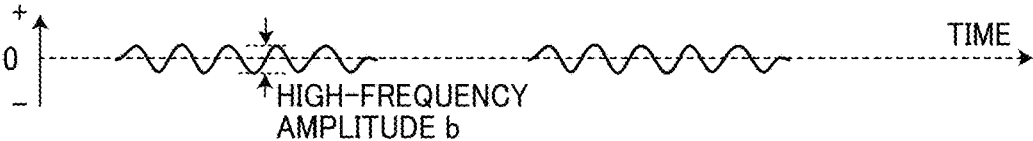
FIG. 13C
DRIVE VOLTAGE B
HIGH-FREQUENCY COMPONENT
OF DEFLECTION ANGLE
FIG. 13D
DEFLECTION ANGLE
OF REFLECTING
SURFACE
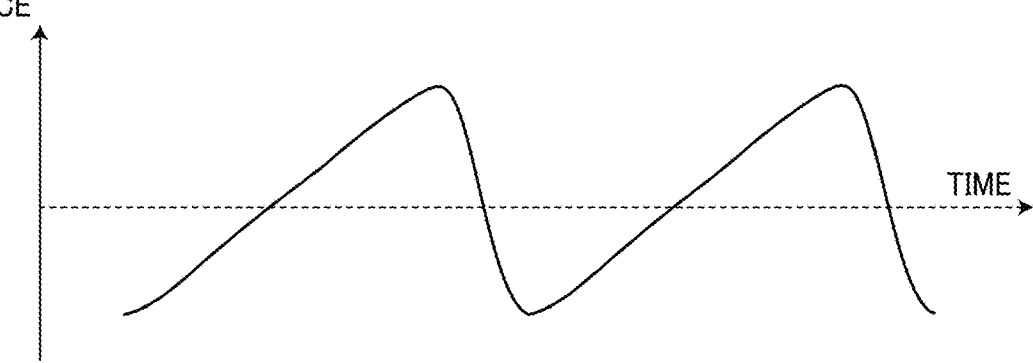

FIG. 19

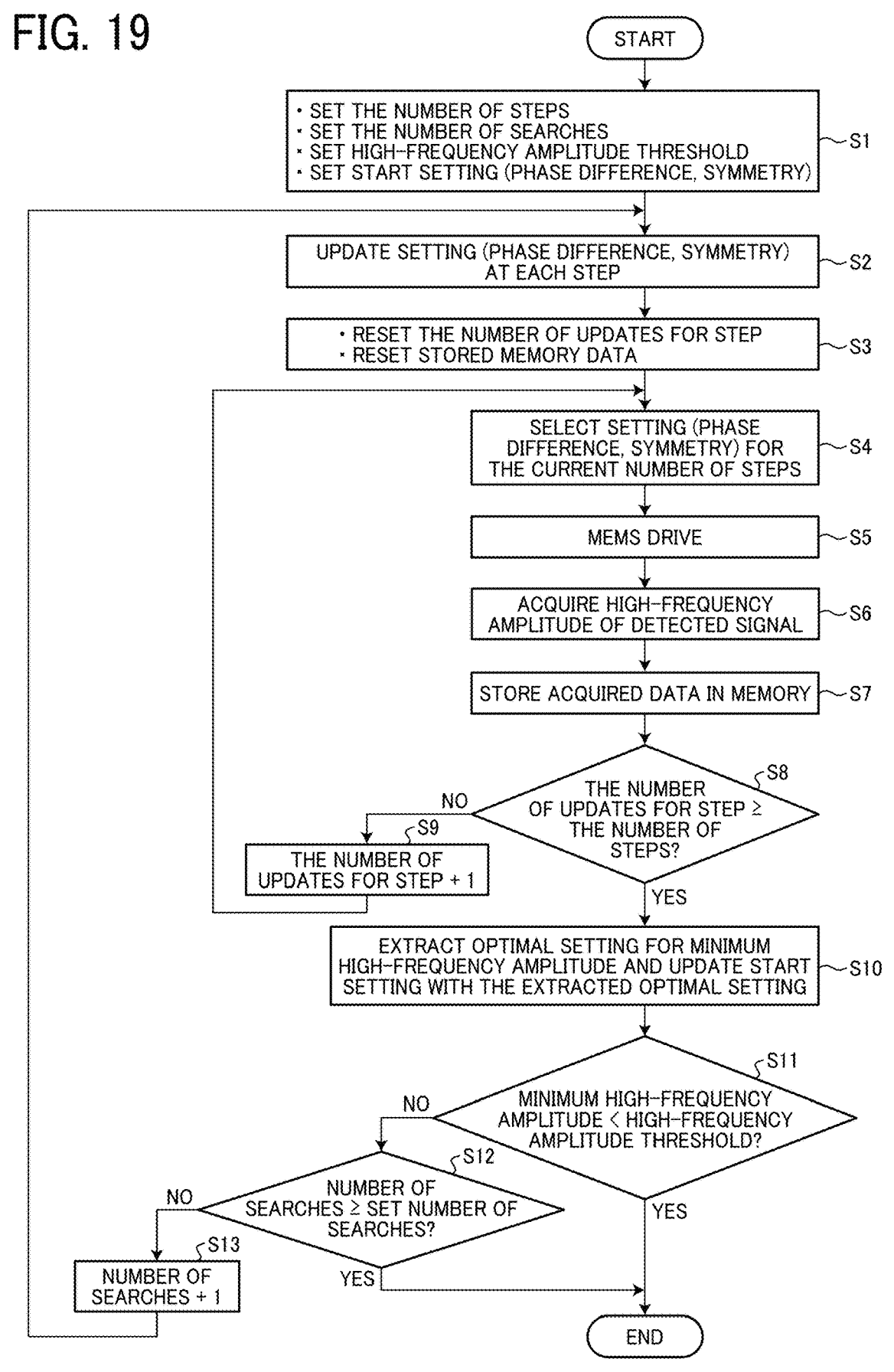

START

- SET THE NUMBER OF STEPS
- SET THE NUMBER OF SEARCHES
- SET HIGH-FREQUENCY AMPLITUDE THRESHOLD
- SET START SETTING (PHASE DIFFERENCE, SYMMETRY) ⟋ S1

UPDATE SETTING (PHASE DIFFERENCE, SYMMETRY) AT EACH STEP ⟋ S2

- RESET THE NUMBER OF UPDATES FOR STEP
- RESET STORED MEMORY DATA ⟋ S3

SELECT SETTING (PHASE DIFFERENCE, SYMMETRY) FOR THE CURRENT NUMBER OF STEPS ⟋ S4

MEMS DRIVE ⟋ S5

ACQUIRE HIGH-FREQUENCY AMPLITUDE OF DETECTED SIGNAL ⟋ S6

STORE ACQUIRED DATA IN MEMORY ⟋ S7

S8 — THE NUMBER OF UPDATES FOR STEP ≥ THE NUMBER OF STEPS?

NO

S9 — THE NUMBER OF UPDATES FOR STEP + 1

YES

EXTRACT OPTIMAL SETTING FOR MINIMUM HIGH-FREQUENCY AMPLITUDE AND UPDATE START SETTING WITH THE EXTRACTED OPTIMAL SETTING ⟋ S10

S11 — MINIMUM HIGH-FREQUENCY AMPLITUDE < HIGH-FREQUENCY AMPLITUDE THRESHOLD?

NO

S12 — NUMBER OF SEARCHES ≥ SET NUMBER OF SEARCHES?

YES

NO

S13 — NUMBER OF SEARCHES + 1

YES

END

FIG. 23

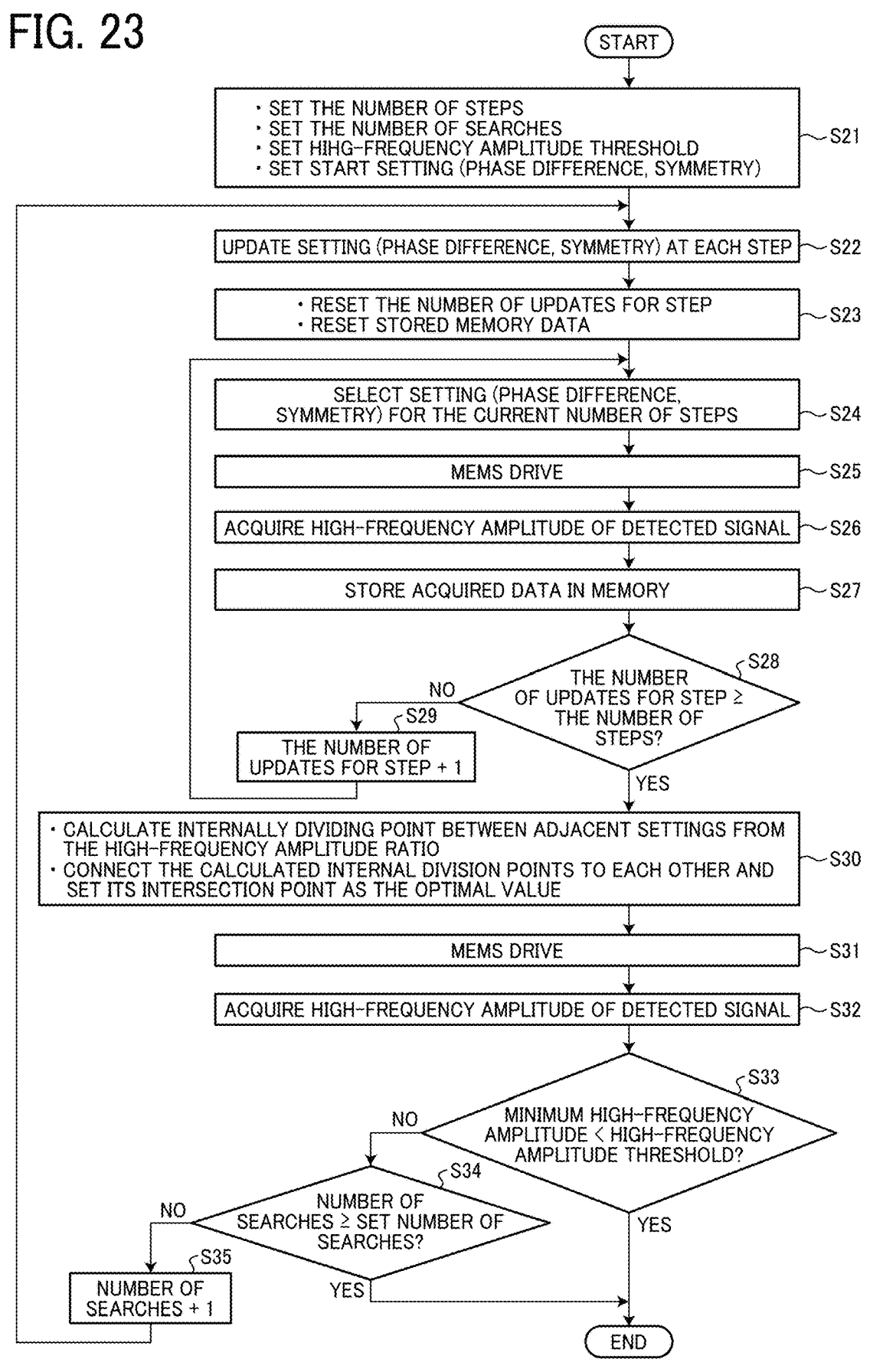

START

- SET THE NUMBER OF STEPS
- SET THE NUMBER OF SEARCHES
- SET HIHG-FREQUENCY AMPLITUDE THRESHOLD
- SET START SETTING (PHASE DIFFERENCE, SYMMETRY)  ～S21

UPDATE SETTING (PHASE DIFFERENCE, SYMMETRY) AT EACH STEP ～S22

- RESET THE NUMBER OF UPDATES FOR STEP
- RESET STORED MEMORY DATA  ～S23

SELECT SETTING (PHASE DIFFERENCE, SYMMETRY) FOR THE CURRENT NUMBER OF STEPS ～S24

MEMS DRIVE ～S25

ACQUIRE HIGH-FREQUENCY AMPLITUDE OF DETECTED SIGNAL ～S26

STORE ACQUIRED DATA IN MEMORY ～S27

S28
THE NUMBER OF UPDATES FOR STEP ≥ THE NUMBER OF STEPS?

NO

S29
THE NUMBER OF UPDATES FOR STEP + 1

YES

- CALCULATE INTERNALLY DIVIDING POINT BETWEEN ADJACENT SETTINGS FROM THE HIGH-FREQUENCY AMPLITUDE RATIO
- CONNECT THE CALCULATED INTERNAL DIVISION POINTS TO EACH OTHER AND SET ITS INTERSECTION POINT AS THE OPTIMAL VALUE  ～S30

MEMS DRIVE ～S31

ACQUIRE HIGH-FREQUENCY AMPLITUDE OF DETECTED SIGNAL ～S32

S33
MINIMUM HIGH-FREQUENCY AMPLITUDE < HIGH-FREQUENCY AMPLITUDE THRESHOLD?

NO

S34
NUMBER OF SEARCHES ≥ SET NUMBER OF SEARCHES?

NO

S35
NUMBER OF SEARCHES + 1

YES

YES

END

FIG. 26

CONTROL SYSTEM, OPTICAL DEFLECTION APPARATUS, IMAGE PROJECTION APPARATUS, MOBILE OBJECT, AND HEAD-MOUNTED DISPLAY

CROSS-REFERENCE TO RELATED APPLICATIONS

This patent application is based on and claims priority pursuant to 35 U.S.C. § 119(a) to Japanese Patent Application No. 2022-114251, filed on Jul. 15, 2022, in the Japan Patent Office, the entire disclosure of which is hereby incorporated by reference herein.

BACKGROUND

Technical Field

The present disclosure relates to a control system, an optical deflection apparatus, an image projection apparatus, a mobile object, and a head-mounted display.

Related Art

A typical movable device includes a reflector on a movable portion elastically supported by a fixed frame, for optical scanning. The movable portion repeatedly performs a tilting action to change the tilt angle of the reflector. Thus, the reflector scans in horizontal and vertical directions.

SUMMARY

An embodiment of the present disclosure provides a control system includes a movable device, a memory, and circuitry. The movable device includes a reflector; paired movable portions to tilt the reflector; and a detector to detect deflection angle of the reflector tilted by the paired movable portions. The circuitry is configured to: output drive signals to the paired movable portions, respectively, to cause the paired movable portions to individually tilt the reflector in accordance with the drive signals; generate the drive signals based on variables of a relation between a symmetry of a ratio of one of a time width of rising duration or a time width of falling duration to one cycle of each of the drive signals and a phase difference between the drive signals; detect, from the movable device, the deflection angle of the reflector with the drive signals by the detector; extract an amplitude of a high-frequency component from a detection signal detected by detecting the deflection angle of the reflector by the detector; store, in the memory, information in which the amplitude of the high-frequency component is associated with values of the variables of the drive signals; select a combination of the values of the variables based on the high-frequency component and the information stored in the memory; and update the drive signals based on the combination of the values of the variables selected.

An embodiment of the present disclosure provides an optical deflection apparatus includes: the control system described above; and a light source to emit light to the movable device. The movable device deflects the light emitted from the light source to form an image.

An embodiment of the present disclosure provides an image projection apparatus includes: the control system described above; and a light source to emit light to the movable device; and a screen onto which an image of the light deflected by the movable device is projected.

An embodiment of the present disclosure provides a mobile object comprising the image projection apparatus described above.

An embodiment of the present disclosure provides a head-mounted display includes: the control system described above; a light source configured to emit light to the movable device; and an image former to form an image of the light deflected by the movable device on a retina of an object.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is a cross-sectional view of a second axis of the mobile device in FIG. 1:

FIG. 3 is a plan view of a movable device in which a first driving unit has a double-supported structure:

FIGS. 11A, 11B, 11C, 11D, 11E, and 11F are graphs of a change in the deflection angle of the reflecting surface when the reflecting surface is driven by the drive voltage A alone or the drive voltage B alone according to an embodiment of the present disclosure;

FIGS. 13A, 13B, 13C, and 13D are graphs of a phase relation between the drive voltage A and the drive voltage B for controlling the moving speed of the reflecting surface to be constant, according to an embodiment of the present disclosure:

FIG. 19 is a flowchart of processing of changing the setting of the symmetry of the drive signals and the phase difference between the drive signals performed by the control device, according to an embodiment of the present disclosure;

FIG. 23 is a flowchart of processing of changing the setting of the symmetry of the drive signals and the phase difference between the drive signals performed by the control device, according to an embodiment of the present disclosure;

FIG. 26 is a hardware block diagram of the optical deflection apparatus in FIG. 25;

Figure 1:
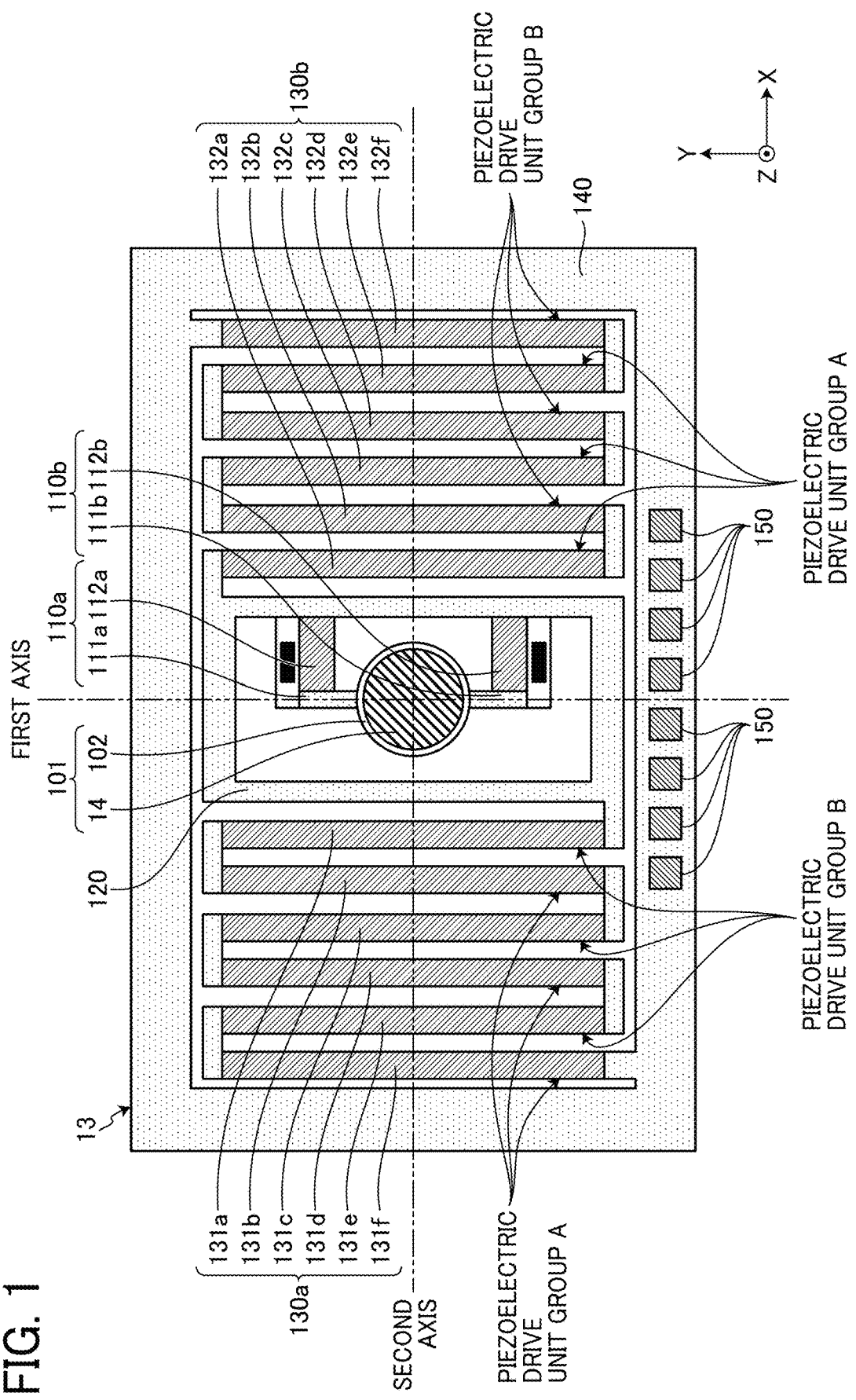
FIG. 1 is a plan view of a movable device in which a first driving unit has a cantilever structure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a." "an," and "the" are intended to include the plural forms as well, unless the context clearly indicates otherwise.

Embodiments of the present disclosure provide a control system, an optical deflection apparatus, an image projection apparatus, a mobile object, and a head-mounted display that achieve a shorter processing time for adjustment of elastic vibration.

First Embodiment

Hereinafter, a first drive portion and a second drive portion correspond to a movable portion.
Configuration of Movable Device FIGS. 1 and 2 are diagrams of a configuration of a movable device according to a first embodiment.

Figure 2:
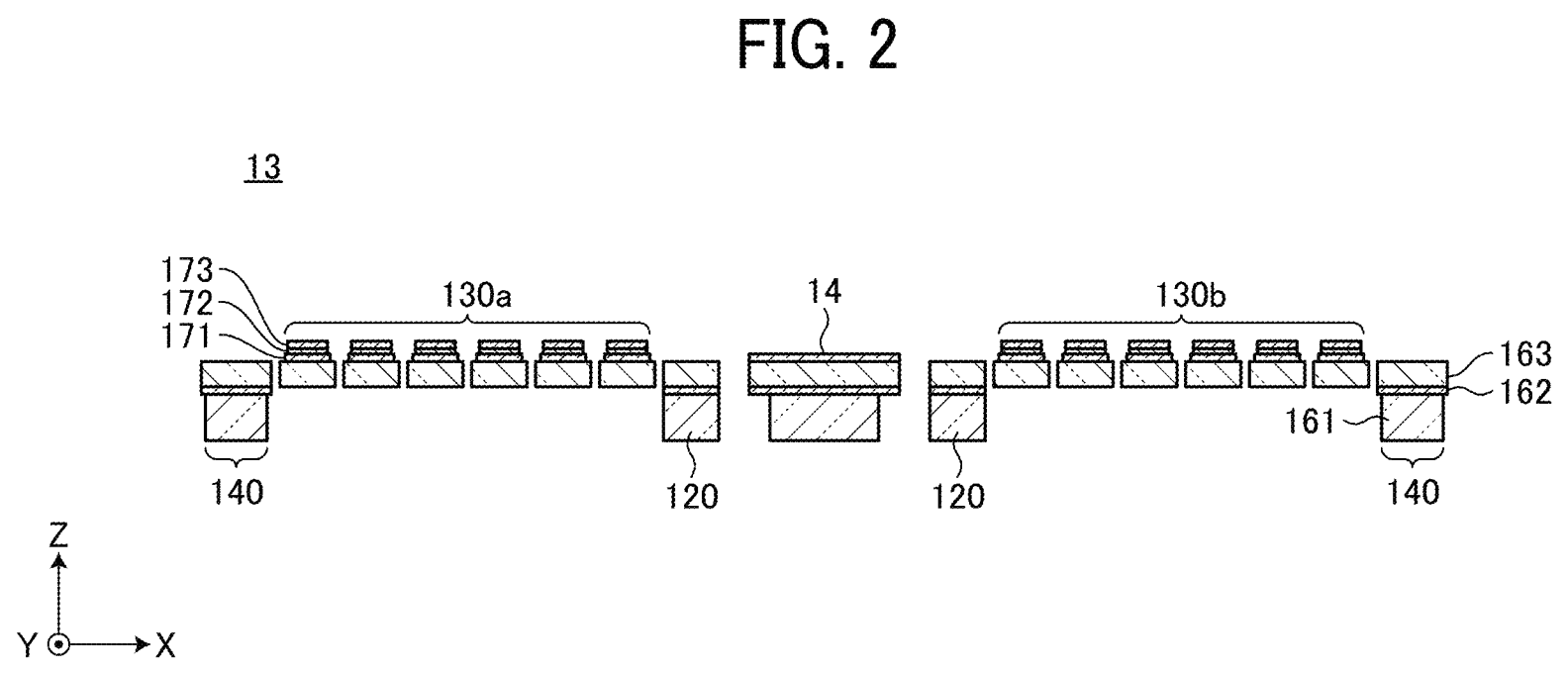

FIG. 1 is a plan view of the movable device in which a first drive portion is a cantilever type. FIG. 2 is a cross-sectional view of the movable device of FIG. 1 taken along a second axis. FIG. 3 is a plan view of a movable device in which the first driving unit is of a both-end supported type. The following describes a configuration of the movable device with reference to FIGS. 1 and 2.

The movable device 13 has a reflector 101, first drive units 110*a* and 110*b*, a first support portion 120, second drive units 130*a* and 130*b*, a support portion 140, and electrode connecting portions 150, which are driven by a control device 11 via the electrode connecting portions 150. The movable device 13 serves as a micro-electromechanical systems (MEMS).

The reflector 101 reflects incident light. The first drive units 110*a* and 110*b*, which are connected to the reflector 101, drives the reflector 101 to move around the first axis parallel to the Y-axis. The first support portion 120 supports the reflector 101 and the first drive unit.

The second drive units 130*a* and 130*b*, which are connected to the first support portion 120, drive the reflector 101 and the first support portion 120 around the second axis parallel to the X-axis. In FIG. 1, each of the second drive unit 130*a* and the second drive unit 130*b* has a meander structure including multiple second piezoelectric drive units 131*a* to 131*f* and 132*a* to 132*f* that are joined to turn.

The second support portion 140 supports the second drive units. The electrode connecting portions 150 are electrically connected to the first drive units and the second drive units.

The movable device 13 is formed of, for example, one silicon on insulator (SOI) substrate that is formed by any appropriate treatment method, such as etching. On the formed SOI substrate, the reflecting surface 14, first piezoelectric drive units 112*a*, 112*b*, the second piezoelectric drive units 131*a* to 131*f*, and 132*a* to 132*f*, and the electrode connecting portions 150 are formed, which constitutes an integral structure of the above-described components. The above-described multiple components may be formed after the SOI substrate is molded, or may be formed while the SOI substrate is being molded.

The SOI substrate is a substrate in which, on a first silicon layer formed of single crystal silicon (Si), a silicon oxide layer 162 is formed, and on the silicon oxide layer 162, a second silicon layer formed of single crystal silicon is further formed. In the following description, the first silicon layer serves as a silicon supporting layer 161, and the second silicon layer serves as a silicon active layer 163.

The silicon active layer 163 has a smaller thickness along the Z-axis than the thickness along the X-axis or the Y-axis. With such a configuration, any member made of the silicon active layer 163 serves as an elastic body having elasticity.

In some embodiments, the SOI substrate has a curvature. In other words, the SOI substrate does not have to be planar. As long as the substrate can be integrally processed by, for example, etching and can be partially elastic, the member used for forming the movable device 13 is not limited to the SOI substrate.

The reflector 101 includes, for example, a circular reflector base 102 and a reflecting surface 14 formed on the +Z-side surface of the reflector base 102. The reflector base 102 includes, for example, the silicon active layer 163. The reflecting surface 14 includes a metal thin film containing, for example, aluminum (Al), gold (Au), or silver (Ag). In some embodiments, the reflector 101 includes a rib for strengthening the reflector 101, on the −Z-side surface of the reflector base 102. Such a rib includes, for example, the silicon supporting layer 161 and the silicon oxide layer 162, serving to prevent the distortion of the reflecting surface 14 due to the motion.

The first drive units 110a and 110b include two torsion bars 111a and 111b and two first piezoelectric drive units 112a and 112b. Each one end of the torsion bars 111a and 111b is connected to the reflector base 102, extending along the first axis to support the reflector 101 to be movable. One ends of the first piezoelectric drive units 112a and 112b are connected with the other ends of the torsion bars 111a and 111b, respectively. The other ends of the first piezoelectric drive units 112a and 112b are connected to the inner surface of the first support portion 120.

The torsion bars 111a and 111b include, for example, the silicon active layer 163. Moreover, the first piezoelectric drive units 112a and 112b include the silicon active layer 163, a lower electrode 171, a piezoelectric portion 172, and an upper electrode 173. The lower electrode 171, the piezoelectric portion 172, and the upper electrode 173 are formed in this order on the +Z-side surface of the silicon active layer 163 serving as an elastic member. Each of the upper electrode 173 and the lower electrode 171 is made of, for example, gold (Au) or platinum (Pt). For example, the piezoelectric portion 172 is made of lead zirconate titanate (PZT), which is a piezoelectric material.

The first support portion 120 is, for example, a rectangular support body including the silicon support layer 161, the silicon oxide layer 162, and the silicon active layer 163. The first support portion 120 surrounds the reflector 101.

The second drive unit 130a includes the second piezoelectric drive units 131a to 131f. The second drive unit 130b include the second piezoelectric drive units 132a to 132f. An end of each of the second drive units 130a and 130b is connected to a peripheral portion of the first support portion 120, and the other end thereof is connected to an inner portion of the second support portion 140. In this case, a position to connect the second drive unit 130a with the first support portion 120 and another position to connect the second drive unit 130b with the first support portion 120 are symmetric with respect to the center point of the reflecting surface 14. In addition, a position to connect the second drive unit 130a with the second support portion 140 and another position to connect the second drive unit 130b with the second support portion 140 are symmetric with respect to the center point of the reflecting surface 14.

The second drive units 130a and 130b include the silicon active layer 163, a lower electrode 171, a piezoelectric portion 172, and an upper electrode 173. The lower electrode 171, the piezoelectric portion 172, and the upper electrode 173 are formed in this order on the +Z-side surface of the silicon active layer 163 serving as an elastic member. Each of the upper electrode 173 and the lower electrode 171 is made of, for example, gold (Au) or platinum (Pt). For example, the piezoelectric portion 172 is made of lead zirconate titanate (PZT), which is a piezoelectric material.

The second support portion 140 is, for example, a rectangular support body including the silicon support layer 161, the silicon oxide layer 162, and the silicon active layer 163, surrounding the reflector 101, the first drive units 110a and 110b, the first support portion 120, and the second drive units 130a and 130b.

The electrode connecting portions 150 are, for example, formed on the +Z-side surface of the second support portion 140. The electrode connecting portions 150 are electrically connected to the upper electrode 173 and the lower electrode 171 of each of the first piezoelectric drive units 112a and 112b, the second piezoelectric drive units 131a to 131f, 132a to 132f, and to the control device 11 via electrode wiring of aluminum (Al). The upper electrode 173 or the lower electrode 171 is directly connected to the electrode connection portion 150. Alternatively, the upper electrode 173 and the lower electrode 171 is connected to each other, to be indirectly connected to the electrode connection portion 150.

Although the present embodiment has illustrated a case in which the piezoelectric portion 172 is formed on one surface (+Z-side surface) of the silicon active layer 163 serving as the elastic body, in some embodiments, the piezoelectric portion 172 is formed on another surface (for example, −Z-side surface) of the elastic body, or on both the one surface and the other surface of the elastic body.

The shapes of the components are not limited to the shapes in the embodiment as long as the reflector 101 can be driven around the first axis or the second axis. For example, the torsion bars 111a and 111b and the first piezoelectric drive units 112a and 112b have a shape with curvature.

Further, an insulating layer including the silicon oxide layer may be disposed on at least any one of the +Z-side surfaces of the upper electrode 173 of the first drive units 110a and 110b, the first support portion 120, the upper electrode 173 of the second drive units 130a and 130b, and the second support portion 140. In this case, electrode wiring is provided on the insulating layer, and the insulating layer is partially removed to form an opening or is not formed at a connection spot where the upper electrode 173 or the lower electrode 171 and the electrode wiring are connected, so that the first drive units 110a and 110b, the second drive units 130a and 130b, and the electrode wiring can be designed with a higher degree of freedom, and a short circuit as a result of contact between electrodes can be substantially prevented. The silicon oxide film also serves as an anti-reflection material.

Control of a Movable Device

Each of the first drive units 110a and 110b and the second drive units 130a and 130b includes the piezoelectric portion 172. When voltage that is positive or negative in the direction of polarization is applied to the piezoelectric portion 172, the piezoelectric portion 172 deforms (for example, expands and contracts) according to the electrical potential of the applied voltage, i.e., inverse piezoelectric effects occur. The first drive units 110a and 110b and the second drive units 130a and 130b move the reflector 101 using the above-described inverse piezoelectric effects.

In this case, the angle defined by the reflecting surface 14 of the reflector 101 with respect to the XY plane when the reflecting surface 14 is inclined to the +Z-direction or −Z-direction with respect to the XY plane is referred to as a deflection angle, or a tilt angle. In particular, the +Z-direction represents a positive deflection angle and the −Z-direction represents a negative deflection angle.

Driving of the first drive units 110a and 110b by the control device 11 is described. The control device 11 controls the first drive units 110a and 110b by applying a drive voltage thereto. In the first drive units 110a and 110b, when a drive voltage is applied in parallel with the piezoelectric portion 172 of the first piezoelectric drive units 112a and 112b through the upper electrode 173 and the lower electrode 171, the piezoelectric portion 172 is deformed. With such deformation of the piezoelectric portion 172, the first piezoelectric drive units 112a and 112b bend and deform, which causes the torsion bars 111a and 111b to be twisted. The torsion bars 111a and 111b being twisted apply a drive force to the reflector 101 to rotate around the first axis O1, so that the reflector 101 can move around the first axis.

Accordingly, the control device 11 applies a drive voltage with a predetermined sine waveform to the first piezoelectric drive units 112a and 112b of the first drive units 110a and 110b, and the reflector 101 can be moved around the first axis in the period of the drive voltage with a predetermined sine waveform.

For example, if the frequency of the sine-waveform voltage is set to about 20 kilohertz (kHz), which is substantially equal to a resonant frequency of the torsion bars 111a and 111b, by using mechanical resonance as a result of the torsion of the torsion bars 111a and 111b, the reflector 101 can be resonated at about 20 kHz.

Although the movable device 13 in FIG. 1 has a cantilever structure in which the first piezoelectric drive units 112a and 112b extend from the torsion bars 111a and 111b in the +X-direction, the movable device 13 is not limited to the cantilever structure. The movable device 13 has any configuration that the piezoelectric drive unit, to which voltage is applied, causes the reflector 101 to move. As illustrated in FIG. 3, for example, a movable device having a double-supported structure in which both ends of the torsion bars 211a and 211b are supported by first piezoelectric drive units 212a and 212b respectively extending from torsion bars 211a and 211b in the +X-direction and first piezoelectric drive units 212c and 212d respectively extending from the torsion bars 211a and 211b in the −X-direction. Alternatively, the movable device 13 has another configuration in which the reflector 101 is movable only in a one-axis direction.

Driving Principle

Driving principle of the second drive units 130a and 130b by the control device 11 is described with reference to FIGS. 4 to 13. Further, in the second drive unit 130a including multiple second piezoelectric drive units 131a to 131f, the second piezoelectric drive units 131b, 131d, and 131f are categorized as a piezoelectric drive unit group A, each of which is an even-numbered second piezoelectric drive unit counted from the second piezoelectric drive unit 131a that is closest to the reflector 101. In the second drive unit 130b including multiple second piezoelectric drive units 132a to 132f, the second piezoelectric drive units 132a, 132c, and 132e are also categorized as a piezoelectric drive unit group A, each of which is an odd-numbered second piezoelectric drive unit counted from the second piezoelectric drive unit 132a that is closest to the reflector 101. Further, in the second drive unit 130a including the multiple second piezoelectric drive units 131a to 131f, the second piezoelectric drive units 131a, 131c, and 131e are categorized as a piezoelectric drive unit group B, each of which is an odd-numbered second piezoelectric drive unit counted from the second piezoelectric drive unit 131a that is closest to the reflector 101. In the second drive unit 130b including the multiple second piezoelectric drive units 132a to 132f, the second piezoelectric drive units 132b, 132d, and 132f are also categorized as the piezoelectric drive unit group B, each of which is an even-numbered second piezoelectric drive unit counted from the second piezoelectric drive unit 132a that is closest to the reflector 101.

The control device 11 applies a drive voltage to drive the second drive units 130a and 130b. The second drive unit 130b is described below as an example. In the second drive unit 130b, the piezoelectric drive unit group A and the piezoelectric drive unit group B correspond to a pair of movable portions. The piezoelectric drive unit group A and the piezoelectric drive unit group B operate so as to give an inclination to the reflector 101. The same applies to the second drive unit 130a, a description of which is omitted.

Figure 4:
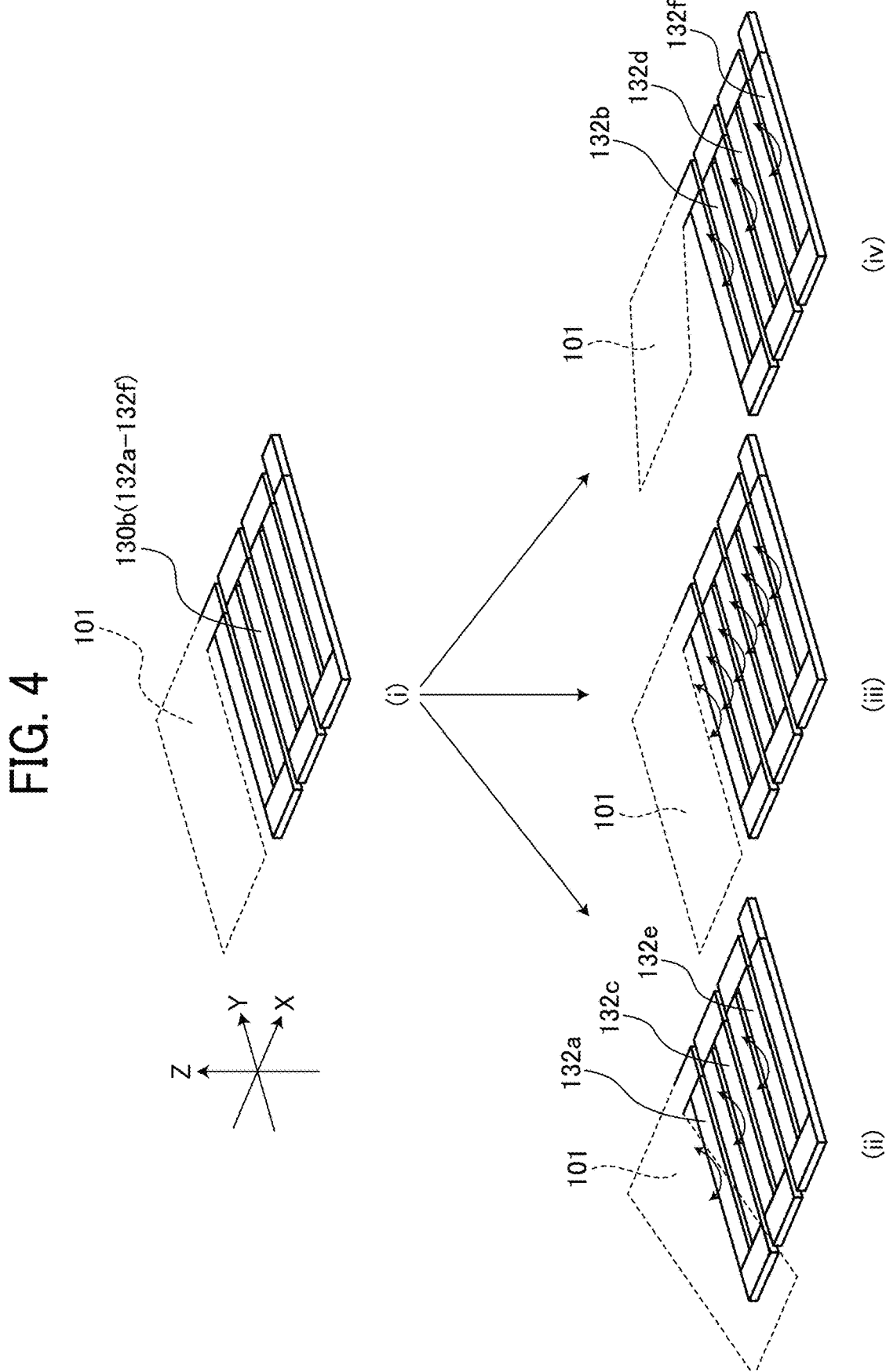
FIG. 4 is a schematic view of driving of a second drive unit of the movable device.

FIG. 4 is a schematic view of driving of the second driving unit 130b of the movable device 13 according to an embodiment of the present disclosure. The reflecting surface 14 of the reflector 101 are indicated by dotted lines. As illustrated in FIG. 4(i), the deflection angle produced by the second drive unit 130b is zero when no drive voltage is applied to the piezoelectric drive unit group A and the piezoelectric drive unit group B of the second drive unit 130b.

When the drive voltage is applied in parallel to the piezoelectric drive unit group A, as illustrated in FIG. 4(ii), the piezoelectric drive unit group A is bent and deformed in the same direction to move the reflector 101 around the second axis in the −Z-direction.

When the drive voltage is applied in parallel to the piezoelectric drive unit group B, as illustrated in FIG. 4(iv), the piezoelectric drive unit group B is bent and deformed in the same direction to move the reflector 101 around the second axis in the +Z-direction.

As illustrated in FIGS. 4(ii) and 4(iv), in the second drive unit 130a or 130b, multiple piezoelectric portions 172 of the piezoelectric drive unit group A or multiple piezoelectric portions 172 of the piezoelectric drive unit group B are concurrently bent and deformed. Thus, the amount of movement due to their bending and deformation is accumulated, increasing the deflection angle of the reflector 101 (i.e., the reflecting surface 14) around the second axis.

As illustrated in FIG. 1, for example, the second drive units 130a and 130b are connected to the first support portion 120 point-symmetrically with respect to the center point of the first support portion 120.

Thus, when the drive voltage is applied to the piezoelectric drive unit group A, a driving force is generated in the second drive unit 130a to move a connecting portion between the first support portion 120 and the second drive unit 130a in the +Z-direction, and another driving force is also generated in the second drive unit 130b to move a connecting portion between the first support portion 120 and the second drive unit 130b in the −Z-direction. Thus, the amount of movement is accumulated, increasing the deflection angle of the reflector 101 (i.e., the reflecting surface 14) around the second axis.

As illustrated in FIG. 4(iii), the deflection angle becomes zero when the amount of movement of the reflector 101 produced by the piezoelectric drive unit group A to which voltage is applied is in balance with the amount of movement of the reflector 101 produced by the piezoelectric drive unit group B to which voltage is applied.

The drive voltage is applied to the second piezoelectric drive units 131*a* to 131*f* and 132*a* to 132*f* while continuously repeating the states in FIGS. 4(*ii*) to 4(*iv*). Thus, the reflector 101 can be driven around the second axis.

Drive Voltages A, B

A drive voltage that is applied to the piezoelectric drive unit group A (hereinafter, drive voltage A), and a drive voltage that is applied to the piezoelectric drive unit group B (hereinafter, drive voltage B) are described referring to FIGS. 5A to 5C.

Figure 5A:
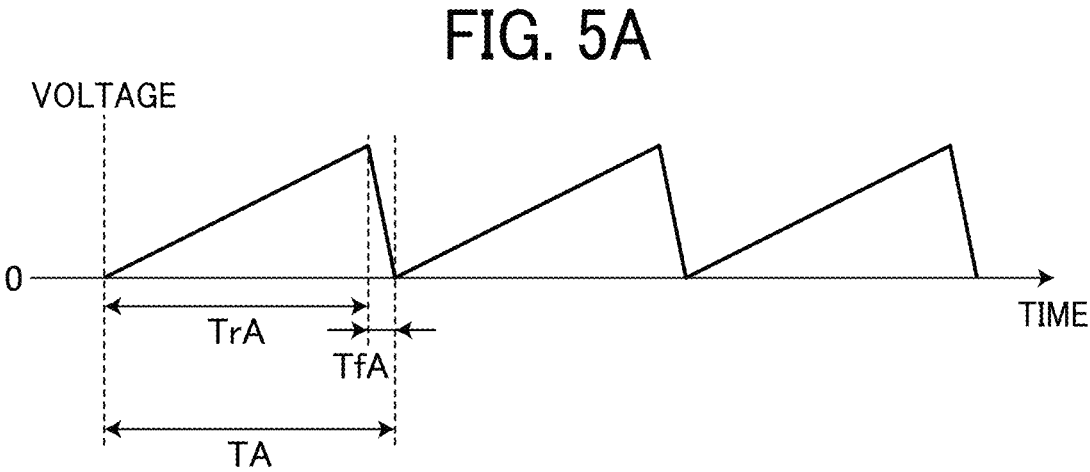
FIGS. 5A, 5B and 5C are graphs of waveforms of drive voltages applied to a piezoelectric drive unit group A of the movable device according to an embodiment of the present disclosure.

FIG. 5A is a graph of a waveform of the drive voltage A applied to the piezoelectric drive unit group A of the movable device 13 according to an embodiment of the present disclosure. FIG. 5B is a graph of a waveform of the drive voltage B applied to the piezoelectric drive unit group B of the movable device 13 according to an embodiment of the present disclosure. FIG. 19C is a graph of the waveform of the drive voltage A and the waveform of the drive voltage B, which are superposed on each other.

As illustrated in FIG. 5A, the drive voltage A that is applied to the piezoelectric drive unit group A is in a sawtooth waveform having a frequency of, for example, 60 hertz (Hz).

The waveform of the drive voltage A has a preset ratio of TrA:TfA=9:1 where TrA is a time width of a rising duration in which the voltage value increases from a minimum value to a maximum value and TfA is a time width of a falling duration in which the voltage value decreases from the maximum value to a next minimum value.

In this case, the ratio of TrA to one cycle is referred to as a symmetry of the drive voltage A.

Figure 5B:
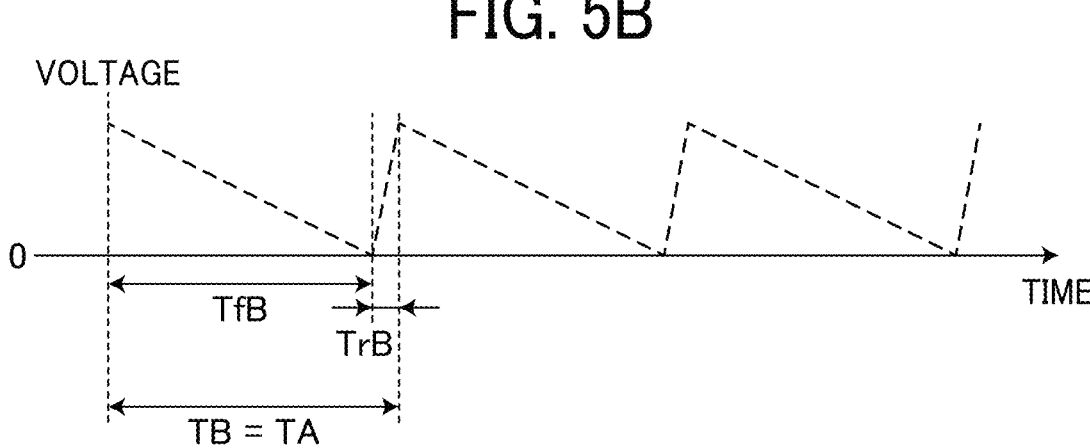
Figure 5C:
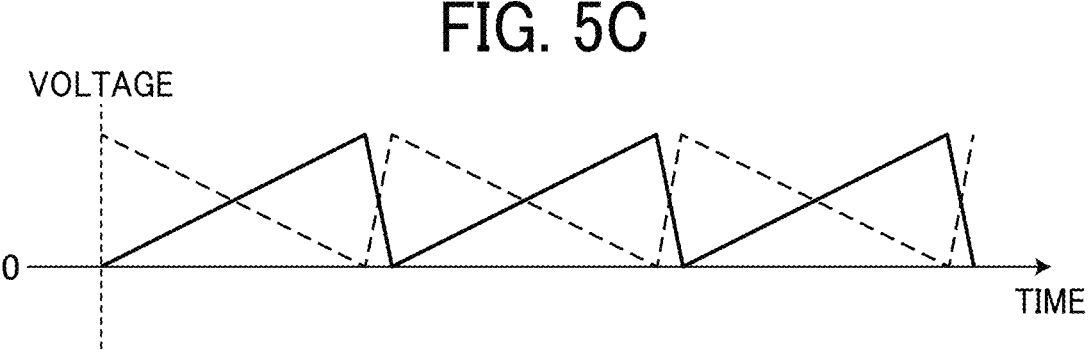

As illustrated in FIG. 5B, the drive voltage B that is applied to the piezoelectric drive unit group B is in a sawtooth waveform having a frequency of, for example, 60 Hz.

The waveform of the drive voltage B has a preset ratio of TfB to TrB as 9:1 (TfB:TrB=9:1) where TrB is a time width of a rising duration in which the voltage value increases from a minimum value to a maximum value and TfB is a time width of a falling duration in which the voltage value decreases from the maximum value to a next minimum value. In this configuration, the ratio of TB to one cycle is referred to as a symmetry of the drive voltage B. As illustrated in FIG. 5C for example, a cycle TA of the waveform of the drive voltage A and a cycle TB of the waveform of the drive voltage B are set to be coincident to each other.

The sawtooth waveforms of the drive voltage A and the drive voltage B are generated by the superposition of sine waves.

In the embodiment, the drive voltages in the sawtooth waveforms are used for the drive voltages A and B, however, no limitation is intended thereby. The waveforms can be changed in accordance with the device characteristics of the movable device. The device characteristics include, for example, a drive voltage with a waveform in which a vertex of a sawtooth waveform is rounded, and a drive voltage with a waveform in which a straight line region of a sawtooth waveform is curved.

Relation Between Time Change of Deflection Angle and High-Frequency Component

The following describes a temporal change in the moving speed of the reflecting surface 14 of the movable device 13 around the second axis, i.e., the deflection angle of the reflecting surface 14 around the second axis.

Figure 6:
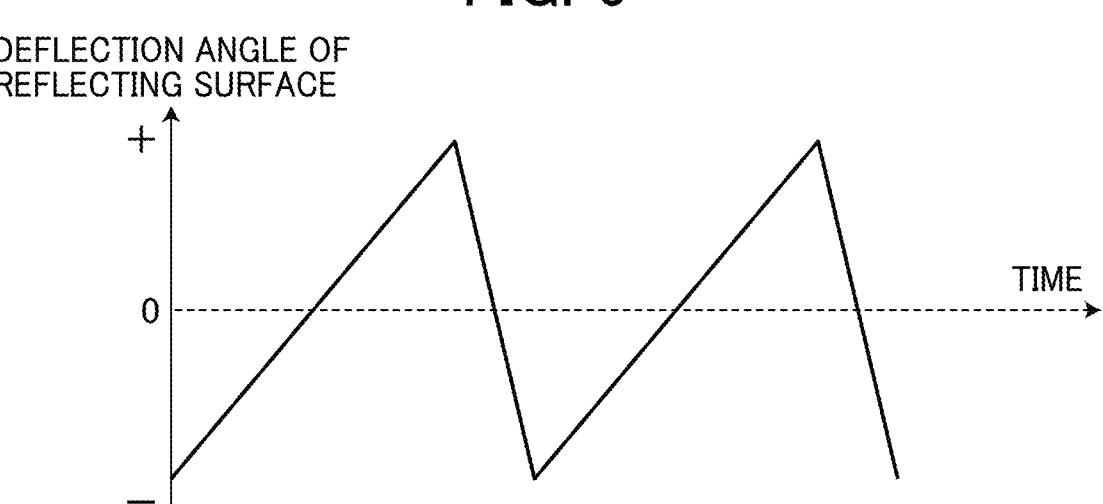
FIG. 6 is a graph of a temporal change in the deflection angle of the reflecting surface about a second axis when the moving speed of the reflecting surface about the second axis is constant (uniform) according to an embodiment of the present disclosure.
Figure 7:
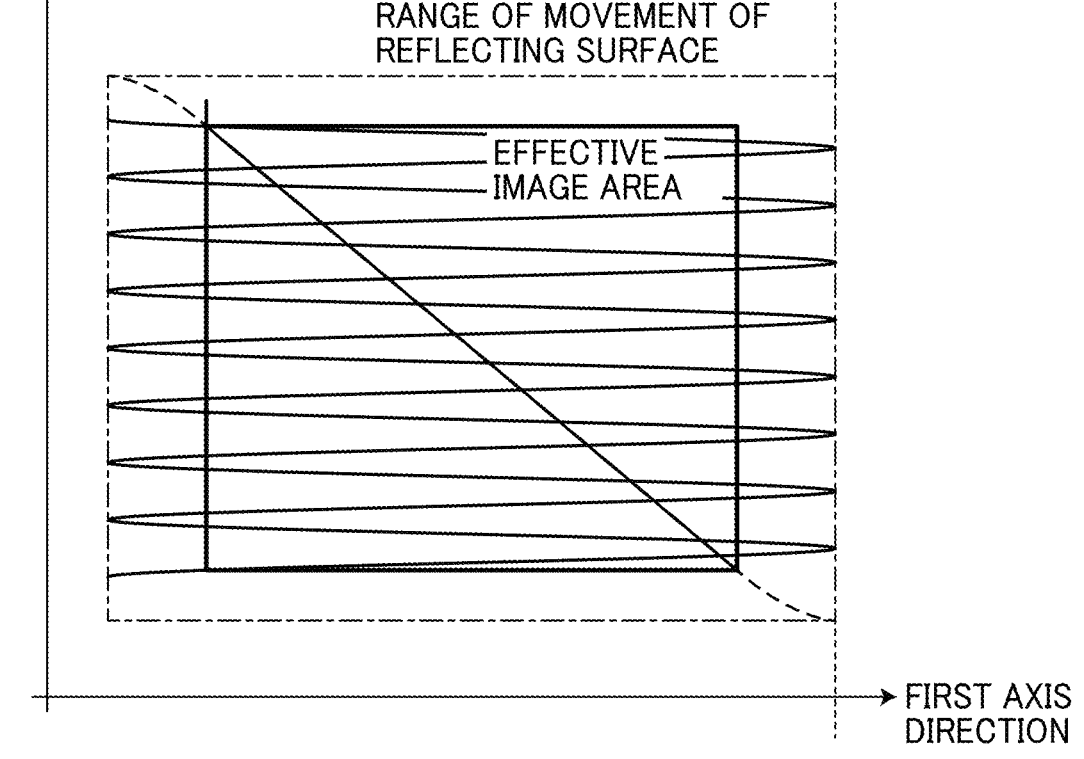
FIG. 7 is a diagram of a projected image when the moving speed of the reflecting surface around the second axis is constant (uniform) according to an embodiment of the present disclosure.

FIG. 6 is a graph of a temporal change in the deflection angle of the reflecting surface 14 about a second axis when the moving speed of the reflecting surface 14 about the second axis is constant (uniform) according to an embodiment of the present disclosure. FIG. 7 indicates a projected image when the moving speed of the reflecting surface 14 around the second axis is constant (uniform). In this case, the moving speed of the reflecting surface 14 is constant around both the first axis and the second axis with an appropriate scanning action. In the present embodiment, an effective image area is an interior of the movable range of the reflecting surface 14.

Figure 8:
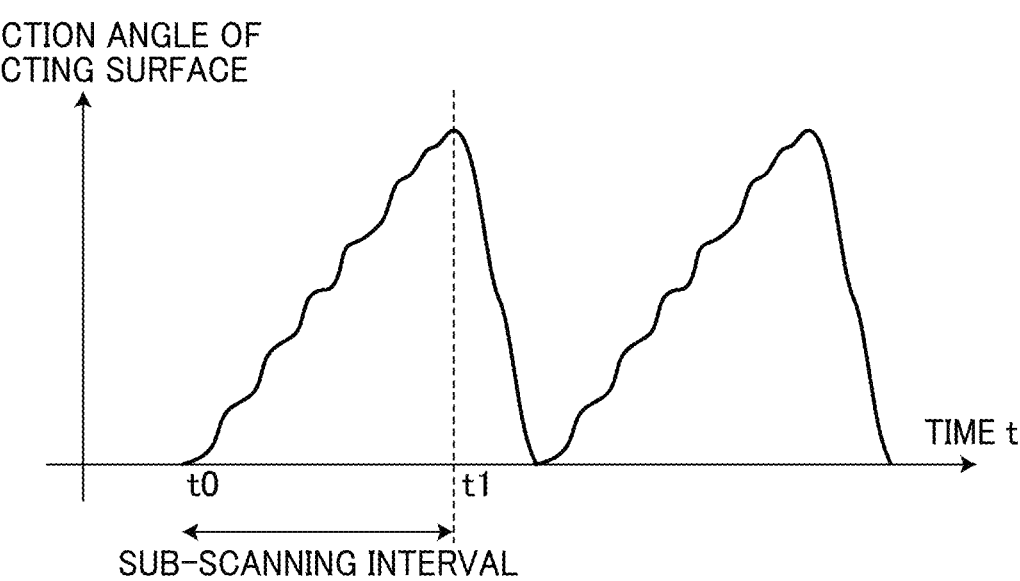
FIG. 8 is a graph of a temporal change in the deflection angle of the reflecting surface about a second axis when the moving speed of the reflecting surface about the second axis is not constant (uniform) according to an embodiment of the present disclosure.
Figure 9:
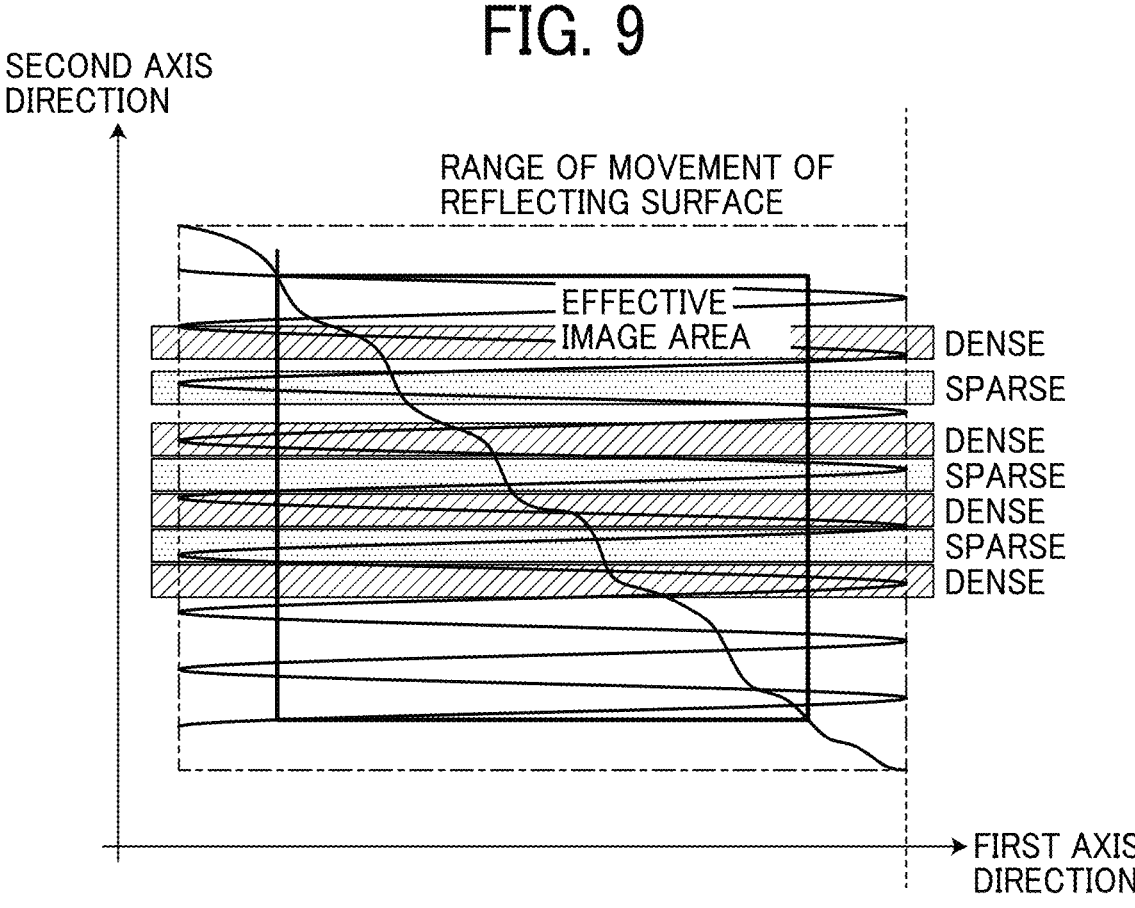
FIG. 9 is a diagram of a projected image when the moving speed is not constant according to an embodiment of the present disclosure.

FIG. 8 is a graph of a temporal change in the deflection angle of the reflecting surface 14 about the second axis when the moving speed of the reflecting surface 14 about the second axis is not constant (uniform) according to an embodiment of the present disclosure. When the moving speed is not uniform as described above, as illustrated in FIG. 9, a projected image has nonuniformity in brightness due to the occurrence of contrast (difference between light and dark) in areas of density variation (i.e., areas of low concentration and high concentration) on the projected image. The fluctuations in the moving speed of the reflector 101 around the second axis hampers a linear optical scanning and causes nonuniformity in luminance and distortion of an image formed onto a scanning target surface. This causes deterioration in image quality.

Preferably, the temporal change in the deflection angle of the reflecting surface 14 around the second axis, i.e., the moving speed of the reflecting surface 14 around the second axis is linear as illustrated in FIG. 6. In other words, preferably, the moving speed of the reflector 101 around the second axis does not vary. As the degree of linearity increases, better linearity is obtained, thus reducing uniformity in brightness. There is a correlation between linearity and uniformity in brightness. However, the moving speed and the deflection angle actually vary during the movement of the reflector 101 around the second axis caused by the second drive units 130*a* and 130*b* as illustrated in FIG. 8.

It is considered that one of the causes of such a fluctuation is that high-frequency components are superimposed on the deflection angle due to elastic vibration generated in the elastic portions supporting the second support portion 140 and the second drive units 130*a* and 130*b*.

The present embodiment controls the moving speed of the reflector 101 to be constant by reducing the high-frequency component from being superimposed on the deflection angle due to the elastic vibration of the elastic portions.

The following describes the reason why the uniformity of the moving speed of the reflector 101 is enhanced by controlling the drive voltage, with reference to FIGS. 10 to 13.

Figure 10A:
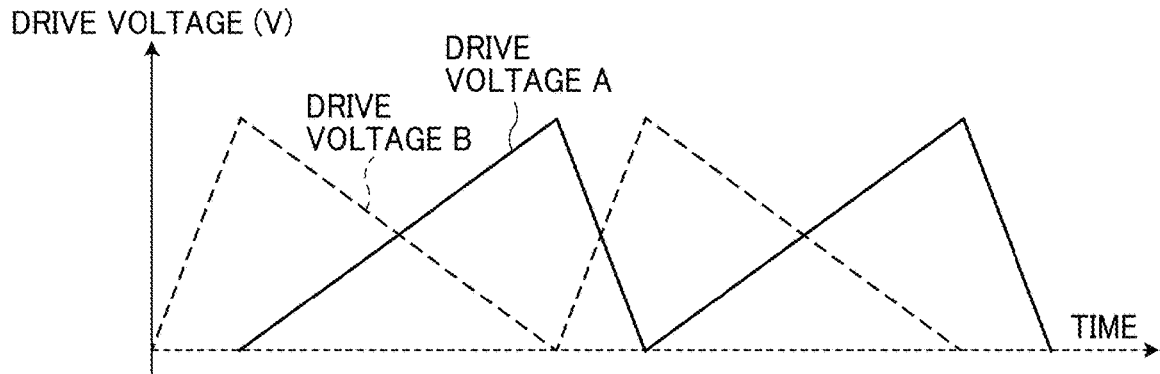
FIGS. 10A, 10B, and 10C are graphs of a change in the deflection angle of the reflecting surface when the reflecting surface is driven by the drive voltages A and B each having a simple sawtooth wave, according to an embodiment of the present disclosure.
Figure 10B:
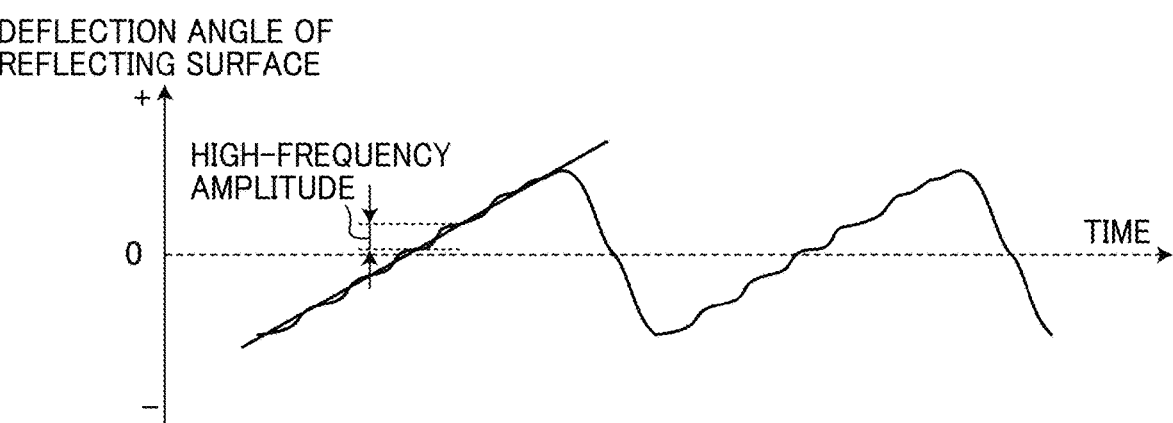
Figure 10C:
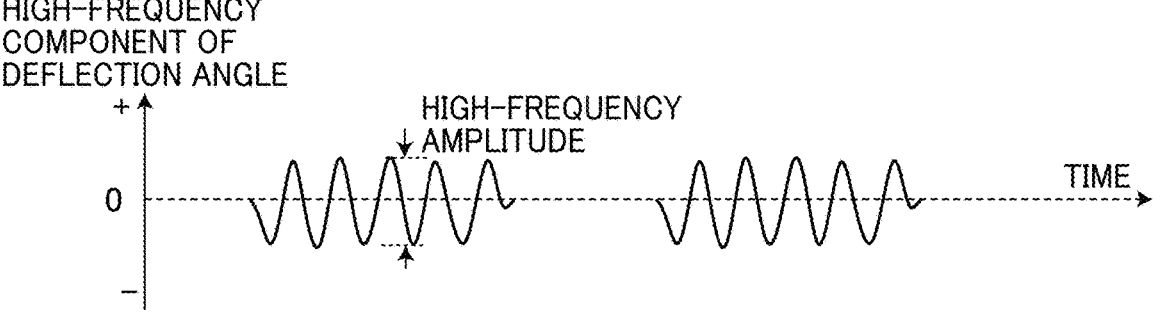

FIGS. 10A, 10B and 10C are graphs of a change in the deflection angle of the reflecting surface when the reflecting surface is driven by the drive voltages A and B each having a simple sawtooth wave, according to an embodiment of the present disclosure.

As illustrated in FIGS. 10A, 10B, and 10C, the drive voltage is affected by the high-frequency component being superimposed on the deflection angle, which causes the fluctuations in the moving speed and results in nonuniformity of the moving speed of the reflecting surface.

FIGS. 11A, 11B, 11C, 11D, 11E, and 11F are graphs of a change in the deflection angle of the reflecting surface when the reflecting surface is driven by the drive voltage A alone or the drive voltage B alone according to an embodiment of the present disclosure.

The deflection angle of the reflecting surface when driven with both of the drive voltages A and B is substantially equal to a value obtained by subtracting the deflection angle B when driven by the drive voltage B alone from the deflection angle A by driven with the drive voltage A alone (i.e., (the deflection angle A of the reflecting surface)–(the deflection angle B of the reflecting surface)).

The following describes the deflection angle of the reflecting surface when the reflecting surface is driven by the driving voltage B alone with its symmetry changed.

Figure 12A:
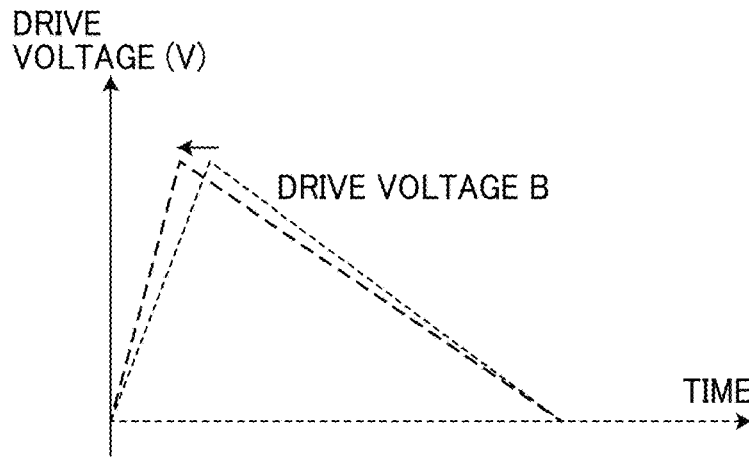
FIGS. 12A, 12B and 12C are graphs of a change in the deflection angle of the reflecting surface when the reflecting surface is driven by the drive voltage B alone with its symmetry changed, according to an embodiment of the present disclosure.
Figure 12B:
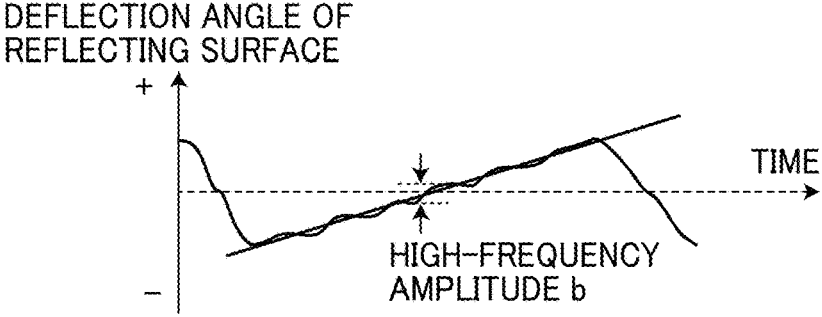
Figure 12C:
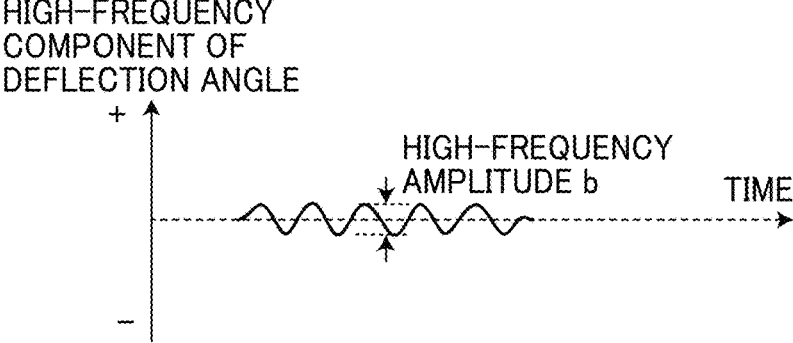

FIGS. 12A, 12B and 12C are graphs of a change in the deflection angle of the reflecting surface when the reflecting surface is driven by the drive voltage B alone with its symmetry changed.

As illustrated in 12A, 12B, and 12C, the amplitude of the high-frequency wave becomes smaller as the voltage gradient of the falling section (scanning section) of the drive voltage B becomes gentler. Based on that fact, the symmetry of the drive voltage B is changed so that the amplitude of the high-frequency wave generated by the drive voltage A matches the amplitude of the high-frequency wave generated by the drive voltage B.

FIGS. 13A, 13B, 13C, and 13D are diagrams of a phase relation between the drive voltage A and the drive voltage B for controlling the moving speed of the reflecting surface to be constant. As illustrated in FIGS. 13A, 13B, 13C, and 13D, a phase difference between the drive voltage A and the drive voltage B are adjusted so that the high-frequency waves generated by the drive voltages A and B have exactly opposite phases.

Embodiments of Movable Device to Control High-Frequency Component

Figure 14:
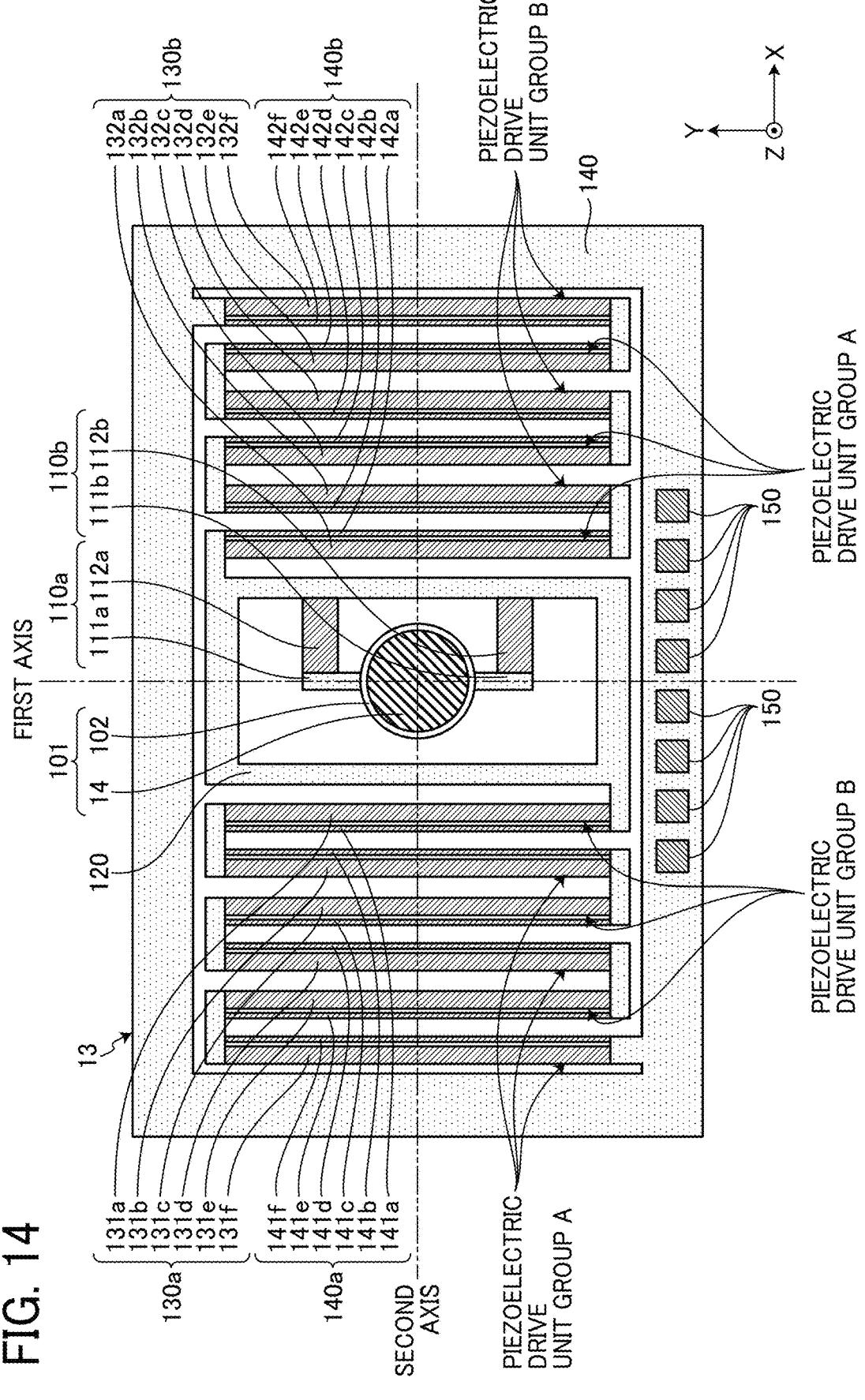
FIG. 14 is a plan view of a detection unit of the movable device according to an embodiment of the present disclosure.

FIG. 14 is a plan view of a detection unit of the movable device according to an embodiment of the present disclosure. The movable device 13 illustrated in FIG. 14 includes a detection unit 140a including detectors 141a, 141b, 141c, 141d, 141 e, and 141f and a detection unit 140b including detectors 142a, 142b, 142c, 142d, 142e, and 142f The detectors 141a, 141b, 141c, 141d, 141e, and 141f are parallel to and slightly spaced away from the second drive unit 130a (without contacting the second drive unit 130a). The detectors 142b, 142c, 142d, 142e, and 142f are parallel to and slightly spaced away from the second drive unit 130b (without contacting the second drive unit 130b).

More specifically, the detection unit 140a (i.e., the detectors 141a, 141b, 141c, 141d, 141e, and 141f) and the detection unit 140b (the detectors 142b, 142c, 142d. 142e, and 142f) are disposed inside the meander structure as illustrated in FIG. 14. The number of detectors corresponds to the number of depths of meander.

The detectors 141a, 141b, 141c, 141d, 141e, 141f, 142b, 142c, 142d, 142e, and 142f 141a to 141f and 142a to 142f are narrower than the second piezoelectric drive units 131a to 131f and the second piezoelectric drive units 132a to 132f, respectively and have substantially equal lengths, having a rectangular shape.

The configuration of layers of the detection unit 140a and the detection unit 140b is the same as the configuration of layers of the drive unit 130a and the drive unit 130b. The detection unit 140a and the detection unit 140b detect information about the angular position (or a rotational position) of the reflecting surface 14 around the second axis (i.e., the reflection angle of the reflecting surface 14 around the second axis). The angular position refers to the position of the reflecting surface 14 of the reflector 101 as a result of the movement (or rotation) of the reflector 101 by the degree of the deflection angle of the reflecting surface 14.

Using the information about the angular position detected by the detection unit 140a and the detection unit 140b, the detected information about the angular position of the reflecting surface 14 is replaced with an actual deflection angle of the reflecting surface 14. Further, based on the detected information about the angular position, the waveform of the drive voltage can be controlled to correct a nonuniform moving speed.

Figure 15:
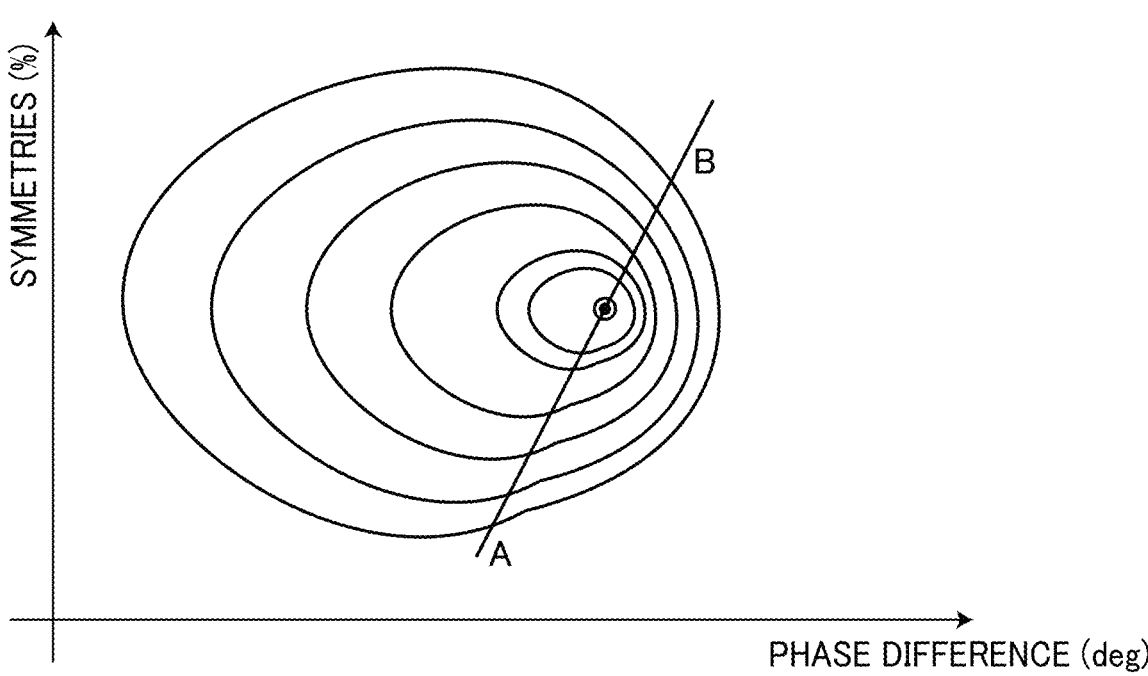
FIG. 15 is a graph of the relation between a phase difference, symmetry, and a linearity value according to an embodiment of the present disclosure.
Figure 16:
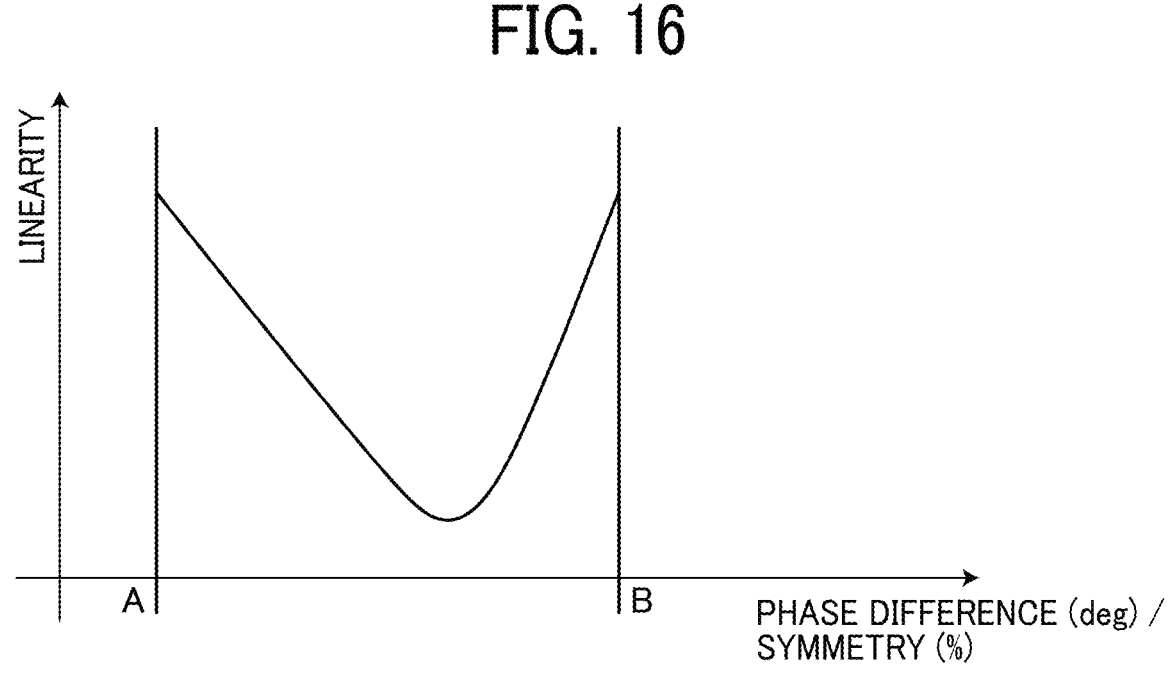
FIG. 16 is a graph of the relation between the phase difference, the symmetry, and the linearity value in a line segment AB in FIG. 15, according to an embodiment of the present disclosure.

FIG. 15 and FIG. 16 are graphs of the relation between a phase difference between a pair of drive signals, symmetry (the symmetry of one drive signal when the symmetry of the other drive signal is fixed), and the linearity value.

FIG. 16 is a graph of the relation between the phase difference, the symmetry, and the linearity value in a line segment AB in FIG. 15.

As illustrated in FIG. 15, a first axis direction (hereinafter referred to as an X-axis direction for convenience) in a two dimensional coordinate axis indicates a phase difference, and a second axis direction (hereinafter referred to as a Y-axis direction for convenience) indicates symmetry. In this case, as illustrated in FIG. 16, the linearity tends to monotonically decrease toward a combination of the phase difference and the symmetry in which the linearity value becomes minimum.

Control System for Movable Device

Figure 17:
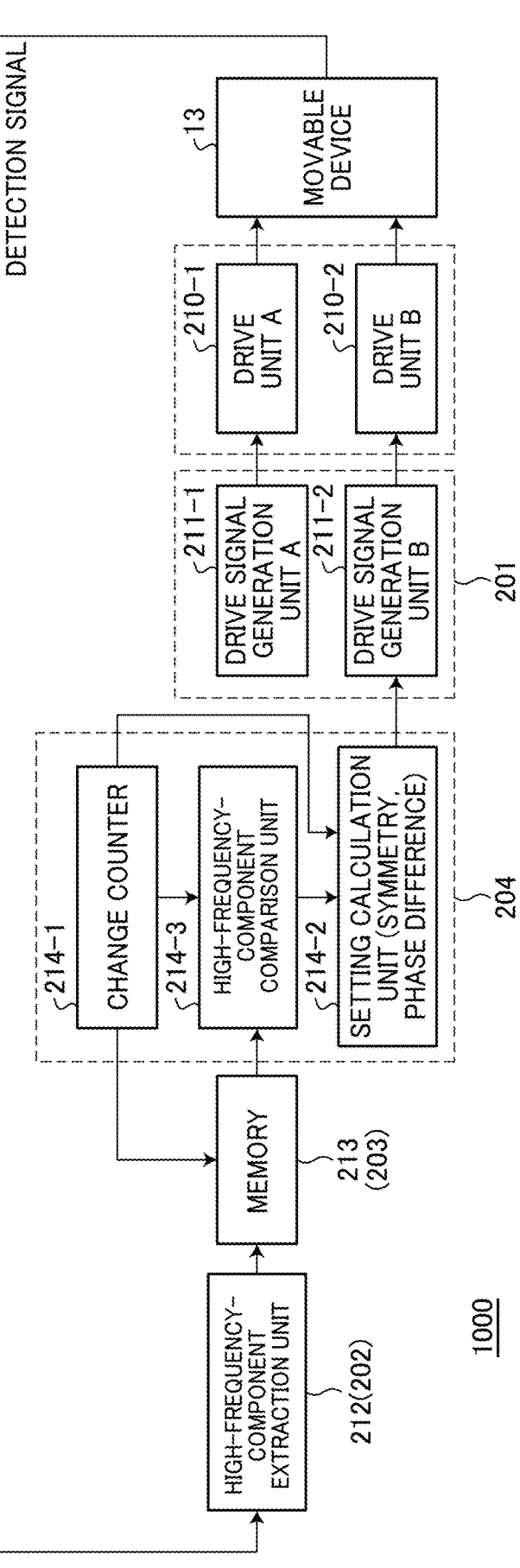
FIG. 17 is a block diagram illustrating a configuration of a control system of the movable device, according to an embodiment of the present disclosure.

FIG. 17 is a block diagram illustrating a configuration of a control system 1000 of the movable device 13, according to an embodiment of the present disclosure. As illustrated in FIG. 17, the movable device 13 is driven under the control of the control device 11.

The control device 11 includes a drive signal generation unit A 211-1, a drive signal generation unit B 211-2, a drive unit A 210-1, a drive unit B 210-2, a high-frequency-component extraction unit 212, a memory 213, a setting-change counter unit (or change counter) 214-1, a setting calculation unit 214-2, and a high-frequency-component comparison unit 214-3.

In the present embodiment, the signal generation unit corresponds to the drive signal generation unit A 211-1 and the drive signal generation unit B 211-2. The high-frequency-component extraction unit corresponds to the high-frequency-component extraction unit 212.

The memory corresponds to the memory 213, and the drive signal selection unit corresponds to the setting-change counter unit 214-1, the setting calculation unit 214-2, and the high-frequency-component comparison unit 214-3.

The drive signal generation unit A 211-1 outputs drive information to the drive unit A 210-1, and the drive unit A 210-1 outputs a drive signal to the piezoelectric drive unit group A of the movable device 13 based on the drive information.

Further, the drive signal generation unit B 211-2 outputs drive information to the drive unit B 210-2, and the drive unit B 210-2 outputs a drive signal to the piezoelectric drive unit group B of the movable device 13 based on the drive information.

The movable device 13 is driven in accordance with the input drive signal. In this case, detected information, which is the detection data on the movement of the reflecting surface 14, is output from the movable device 13 to the high-frequency-component extraction unit 212.

The high-frequency component extraction unit 212 extracts the amplitude of the high-frequency component and outputs the extracted amplitude of the high-frequency component to the memory 213. In this case, the counter number from the setting-change counter unit 214-1 is also stored in the memory 213 as data associated with the values of the two variables: the symmetry and the phase difference, which are current setting parameters in the setting calculation unit 214-2.

The setting-change counter unit 214-1 counts the number of setting changes and outputs a signal indicating that the number of setting changes has reached a specified number to the high-frequency-component comparison unit 214-3 when the number of setting changes has reached the specified number.

Upon receiving the signal indicating that the number of setting changes has reached a specified number, the high-frequency-component comparison unit 214-3 reads out, from the memory 213, data on the amplitude of the high-frequency components corresponding to the prescribed number of setting changes, and, based on that data, calculates setting parameters (the phase difference and the symmetry) at which the amplitude of the high-frequency component becomes minimum.

The setting calculation unit 214-2 changes the setting parameters (phase difference and symmetry) in a predetermined order. Upon receiving the signal indicating that the number of setting changes has reached a specified number from the setting-change counter unit 214-1, the setting calculation unit 214-2 updates (or changes) the setting parameters using the setting parameters (the phase difference and symmetry) that minimizes the amplitude of the high-frequency component calculated by the high-frequency-component comparison unit 214-3. At this time, the data of the memory 213 and the count number of setting changes of the setting-change counter unit 214-1 are reset. The setting calculation unit 214-2 changes the setting parameters again in accordance with the predetermined order and the updated setting parameters (phase difference and symmetry).

The setting calculation unit 214-2 outputs the calculated setting parameter (phase difference and symmetry) to the drive signal generation unit B 211-2. Based on the input symmetry and phase difference, the drive signal generation unit B 211-2 updates the drive information and outputs the updated drive information to the drive unit B 210-2 to control the drive waveform.

In the present embodiment, drive information is updated for the drive unit B 210-2. However, alternatively, drive information is updated for the drive unit A 210-1. Alternatively, drive information is updated for both the drive unit A 210-1 and the drive unit B 210-2.

Figure 18:
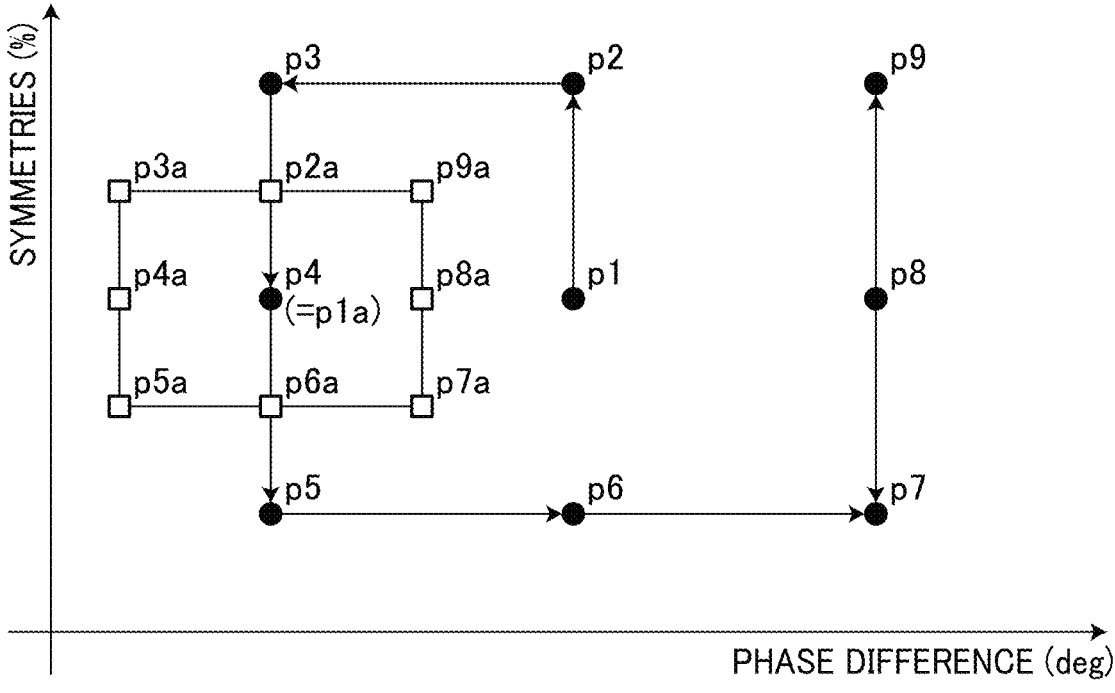
FIG. 18 is a graph of processing of searching for an optimal setting of a combination of phase difference and symmetry according to an embodiment of the present disclosure.

FIG. 18 is a graph of processing of searching for an optimal setting of a combination of the phase difference between paired drive signals and the symmetry (i.e., a symmetry of one signal when a symmetry of the other drive signal is fixed). As illustrated in FIG. 18, the positions of combination of the phase difference and the symmetry for p1 to p9 are determined so as to surround the coordinates, or a coordinate point (hereinafter referred to as a position) of p1. The positions of p1 to p9 are equidistant from the position of p1, serving as the reference (center), with equal spacing horizontally and vertically, but with different intervals. The horizontal spacing follows a first interval, while the vertical spacing follows a second interval different from the first interval.

The set values of the phase difference and the symmetry are sequentially changed for p1 to p9, and the linearity values at the respective points are measured. Other combinations of the phase difference and the symmetry are newly determined as p2a to p9a so as to surround the position of p(minimum), i.e., p(4) in this example, at which the linearity has the smallest value among the measured p2 to p9. The positions of p2a to p9a are equidistant from the position of p (minimum), serving as the center, with equal spacing horizontally and vertically, but with different intervals. The horizontal spacing follows a third interval that is half of the above first interval, while the vertical spacing follows a fourth interval that is half of the above second interval.

Similarly, the set values of the phase difference and the symmetry are sequentially changed for p1a to p9a, and the linearity values at the respective points are measured. Still other combinations of the phase difference and the symmetry are further newly determined with p (minimum)a, at which the linearity has the smallest value among the measured pa1 to pa9, serving as the center. The positions of the newly determined combinations are equidistant from the p (minimum)a serving as the center with equal spacing horizontally and vertically, but with different intervals. The horizontal spacing follows half of the above third interval, while the vertical spacing follows half of the above fourth interval.

By repeating this processing, the optimal setting can be derived. Although nine points from p1 to p9 are given in the present embodiment, the number of points is not limited to nine as long as the number of points is plural.

FIG. 19 is a flowchart of processing of changing the setting of the symmetry of the drive signals and the phase difference between the drive signals performed by the control device 11, according to an embodiment of the present disclosure. In the following description, the MEMS corresponds to the movable device.

First, the control device 11 performs initial setting (S1). For example, the control device 11 sets the number of steps to 9 (p1 to p9) and sets the number of searches to 2. Then, the control device 11 sets the high-frequency amplitude threshold to linearity values at which nonuniformity in brightness is not recognized in the projected image and sets phase differences and symmetry as start settings.

The control device 11 prepares (updates) the settings for the phase differences and symmetry of pX (p1 to p9) in step (S2).

The control device 11 resets the step counter and resets the date stored in the memory 213 (S3). In one example, the step counter advances from 1 to 9 and returns to 1 when the counter reaches 9.

The control device 11 selects the MEMS drive setting (phase difference and symmetry) based on the current number of steps (p1 to 9)(S4).

Then, the control device 11 performs MEMS driving in accordance with the setting in the S4 (S5).

The control device 11 acquires the high-frequency amplitude to be superimposed on the detected signal obtained by tracing the deflection angle of the mirror deflection angle from the MEMS mirror (S6).

The control device 11 stores the high-frequency amplitude and the number of steps acquired in the S6 in association with each other in the memory 213 (S7).

The control device 11 determines whether the number of step updates reaches the number of steps (S8).

Based on a determination that the number of step updates has not reached the number of steps (NO in S8), the control device 11 increments the number of step updates by one and proceeds to S4 (S9).

Since the number of step updates has reached the number of steps, the control device 11 sets the MEMS drive setting (phase shift and symmetry) that minimizes the high-frequency amplitude stored in the memory as the optimal setting (S10).

The control device 11 determines whether the minimum high-frequency amplitude set in S10 is smaller than the high-frequency amplitude set in S1 (S11). If the minimum high-frequency amplitude set in S10 is smaller than the high-frequency amplitude threshold value (YES in S11), the nonuniformity in brightness is not recognized, and thus the control device 11 ends the processing (the optimal setting is recognized as the final setting).

If the minimum high-frequency amplitude set in S10 is greater than the high-frequency amplitude threshold value (NO in S11), the control device 11 compares the number of searches with the number of searches set in S1 (S12). If the number of searches has reached the number of searches set in S1 (YES in S12), the control device 11 ends the processing.

If the number of searches has not reached the number of searches set in S1 (NO in S12), the control device 11 increments the number of searches by one and proceeds to S2 (S13).

As described above, the movable device 13 according to the first embodiment reduces the high-frequency components of elastic vibration generated in the elastic portions supporting the second support portion 140 and the drive units 130a and 130b, and thus enables controlling of the drive voltage to allows a constant moving speed of the reflecting surface 14 of the reflector 101. This enables a shorter time for adjusting the elastic vibration caused by the setting change.

Second Embodiment

Figure 20:
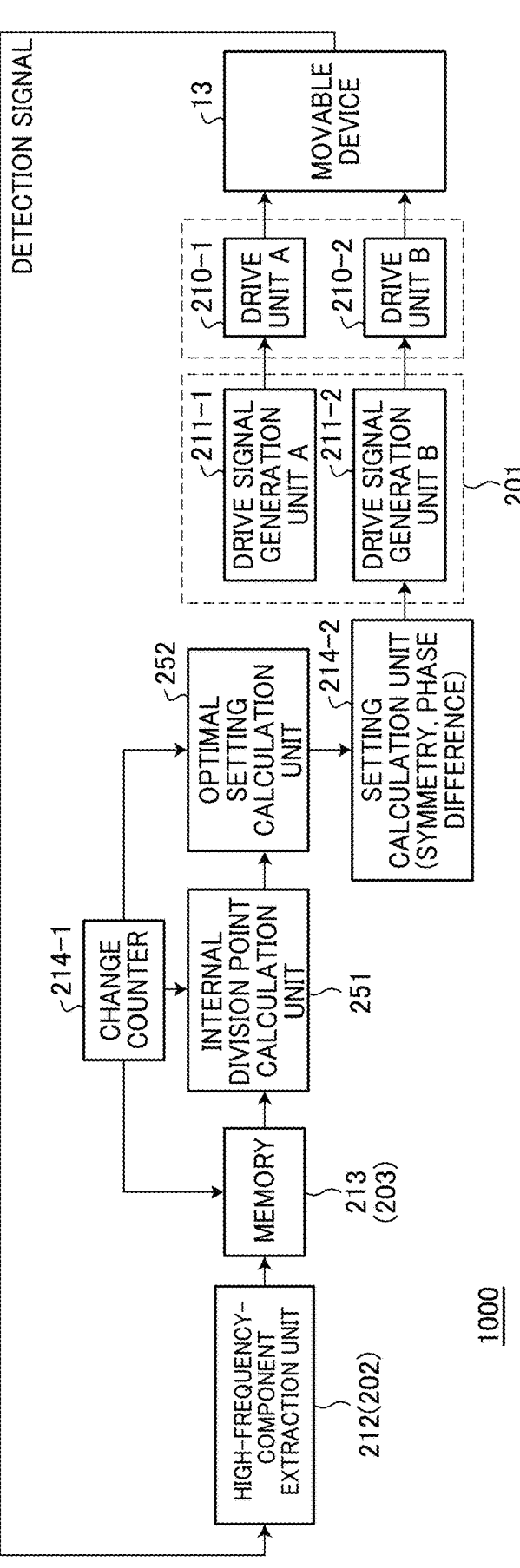
FIG. 20 is a block diagram illustrating a configuration of a control system of the movable device according to a second embodiment of the present disclosure.

FIG. 20 is a block diagram illustrating a configuration of a control system 1000 of the movable device according to a second embodiment of the present disclosure. The control device 11 includes a drive signal generation unit A 211-1, a drive signal generation unit B 211-2, a drive unit A 210-1, a drive unit B 210-2, a high-frequency-component extraction unit 212, a memory 213, a setting-change counter unit 214-1, a setting calculation unit 214-2, and an internal division point calculation unit 251, and an optimal setting calculation unit 252. Similarly to the first embodiment, the pieces of drive information are respectively output from the drive signal generation unit A 211-1 and the drive signal generation unit B 211-2 to the drive unit A 210-1 and the drive unit B 210-2, and, based on the input drive information, the drive signals are respectively output from the drive unit A 210-1 and the drive unit B 210-2 to the movable device 13. The movable device 13 is driven in accordance with the input drive signal. In this case, detected information, which is the detection data about the movement of the reflecting surface 14, is output from the movable device 13 to the high-frequency-component extraction unit 212. The high-frequency component extraction unit 212 extracts the amplitude of the high-frequency component and outputs the extracted amplitude of the high-frequency component to the memory 213.

The drive signal selection unit corresponds to the setting-change counter unit 214-1, the setting calculation unit 214-2, the internal division point calculation unit 251, and the optimal setting calculation unit 252.

In the second embodiment, when the amplitude of the high-frequency component is stored in the memory 213, the counter number from the setting-change counter unit 214-1 is also stored in the memory 213 as data associated with the setting parameter (i.e., the symmetry and the phase difference) which are current setting parameters in the setting calculation unit 214-2.

The setting-change counter unit 214-1 counts the number of setting changes and outputs a signal indicating that the number of setting changes has reached a specified number to the internal division point calculation unit 251 when the number of setting changes has reached the specified number.

Upon receiving the signal indicating that the number of setting changes has reached a specified number, the internal division point calculation unit 251 reads out, from the memory 213, data on the amplitude of the high-frequency components corresponding to the prescribed number of setting changes, and, based on that data, calculates an internal division point from a linearity value at a setting parameter position and a linearity value at an adjacent setting parameter position.

The calculated internal division points are input to the optimal setting calculation unit 252, and an intersection point obtained by connecting the internal division points with lines is set as an optimal setting parameter. Using the optimal setting parameter, the setting calculation unit 214-2 updates the setting parameter. At this time, the data of the memory 213 and the count number of setting changes of the setting-change counter unit 214-1 are reset. The updated setting parameters (the phase differences and the symmetry) are output to the drive signal generation unit B 211-2. Based on the input symmetry and phase difference, the drive signal generation unit B 211-2 updates the drive information and outputs the updated drive information to the drive unit B 210-2 to control the drive waveform.

In the present embodiment, drive information is updated for the drive unit B 210-2. However, alternatively, drive information is updated for the drive unit A 210-1. Alternatively, drive information is updated for both the drive unit A 210-1 and the drive unit B 210-2.

Figure 21:
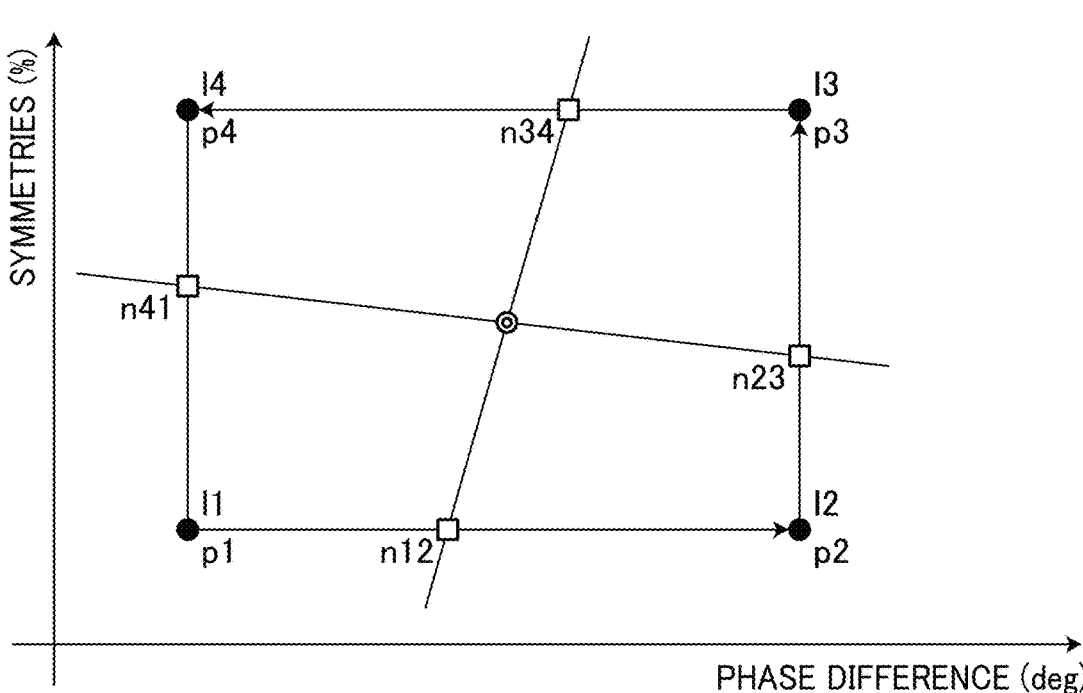
FIG. 21 is a graph of processing of searching for an optimal setting of a combination of phase difference and symmetry according to an embodiment of the present disclosure.

FIG. 21 is a graph of processing of searching for an optimal setting of a combination of the phase difference between paired drive signals and the symmetry (i.e., a symmetry of one signal when a symmetry of the other drive signal is fixed). First, as illustrated in FIG. 21, the positions of combinations of the phase differences and the symmetries of the quadrangles p1 to p4 are determined. Next, the set values of the phase differences and the symmetries are sequentially changed from p1 to p4, and the linearity values (l1 to l4) at the respective points are measured.

Then, internal division points are obtained from positions adjacent to each other (p1 and p4, p2 and p3, p3 and p4, p4 and p1) at the measured linearity values of p1 to p4.

When the linearity value at p(n) is l(n), the internal division point between p1 and p2 is $n12 = p1 + l1/(l1 + l2)$. Each internal division point is expressed as follows when obtained as descried above.

$$n23 = p2 + l2/(l2 + l3)$$

$$n34 = p4 + l4/(l4 + l3)$$

$$n41 = p1 + l1/(l1 + l4)$$

The internal division points opposed to each other are connected by a line. An intersection of the lines connecting the internal division points opposed to each other is determined as an optimal position. Thus, the optimal position can be estimated by performing linearity measurement at four points. This method for estimating and determining an optimal position shorten the time for searching for the optimal position unlike another method by sequentially comparing the linearities. Further updating the four points with the optimal point as the center again and repeating the above processing allows an optimal setting to be driven with higher accuracy.

The four points are described as one example. Alternatively, multiple points other than four points are used.

In the present embodiment, a rectangular shape is taken as an example. However, no limitation is intended therein. Alternatively, the shape is as illustrated in FIG. 22.

Figure 22:
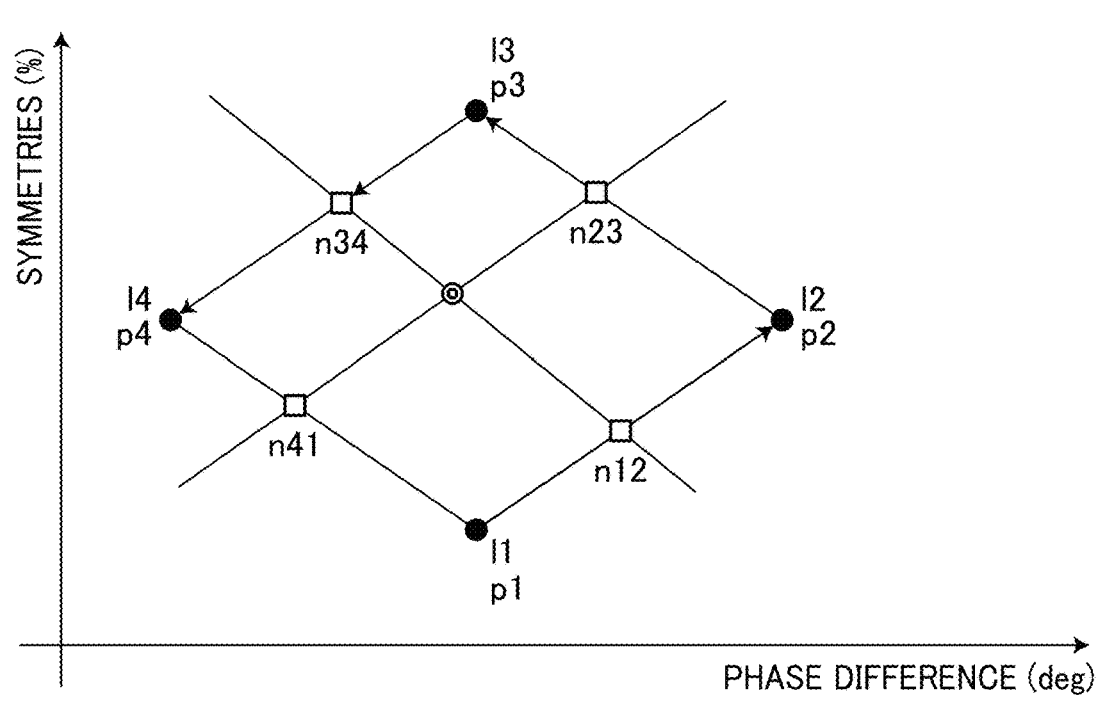
FIG. 22 is a graph of processing of searching for an optimal setting for a rhombic shape.

FIG. 22 is a graph of processing of searching for an optimal setting for a rhombic shape. Even if the phase difference and the symmetry are changed at the same time as in the diamond shape, the same processing can be performed.

FIG. 23 is a flowchart of processing of changing the setting of the symmetry of the drive signals and the phase difference between the drive signals performed by the control device 11, according to an embodiment of the present disclosure. First, the control device 11 performs initial setting (S21).

For example, the control device 11 sets the number of steps to 4 (p1 to p4) and sets the number of searches to 1. Then, the control device 11 sets the high-frequency amplitude threshold to linearity values at which nonuniformity in brightness is not recognized in the projected image and sets phase differences and symmetry as start settings.

Subsequently, the control device 11 prepares (updates) the settings for the phase differences and symmetry of pX (p1 to p4) in step (S22).

Subsequently, the control device 11 resets the step counter (S23). In one example, the step counter advances from 1 to 4 and returns to 1 when the counter reaches 4.

Subsequently, the control device 11 selects the MEMS drive setting (phase difference and symmetry) based on the current number of steps (p1 to 4) (S24).

Then, the control device 11 performs MEMS driving in accordance with the setting in the S24 (S25).

The control device 11 acquires the high-frequency amplitude to be superimposed on the detected signal obtained by tracing the mirror deflection angle from the MEMS mirror (S26).

The control device 11 stores the high-frequency amplitude and the number of steps acquired in the S26 in association with each other in the memory (S27).

The control device 11 determines whether the number of step updates reaches the number of steps (S28).

Based on a determination that the number of step updates has not reached the number of steps (NO in S28), the control device 11 increments the number of step updates by one and proceeds to S24 (S29).

Based a determination that the number of step updates has reached the number of steps (YES in S28), the control device 11 calculates an internal division point from a ratio of high-frequency amplitude values in adjacent steps and connects the internal division point and a line (internal division line) opposed to each other at the calculated internal division point, and sets an intersection point of the internally dividing lines as an optimum setting of MEMS drive settings (phase differences and symmetries)(S30).

The control device 11 drives the MEMS by using the MEMS driving setting set in S30 (S31).

The control device 11 acquires the high-frequency amplitude to be superimposed on the detected signal obtained by tracing the mirror deflection angle from the MEMS mirror (S32).

The control device 11 determines whether the optimal high-frequency amplitude set in S32 is smaller than the high-frequency amplitude set in S21 (S33). If the optimal high-frequency amplitude set in S32 is smaller than the high-frequency amplitude threshold value (YES in S33), the nonuniformity in brightness is not recognized, and thus the control device 11 ends the processing (the optimal setting is recognized as the final setting).

If the optimal high-frequency amplitude set in S32 is greater than the high-frequency amplitude threshold value (NO in S33), the control device 11 compares the number of searches with the number of searches set in S21 (S34). If the number of searches has reached the number of searches set in S21 (YES in S34), the control device 11 ends the processing.

If the number of searches has not reached the number of searches set in S21 (NO in S34), the control device 11 increments the number of searches by one and proceeds to S22 (S35).

Figure 24:
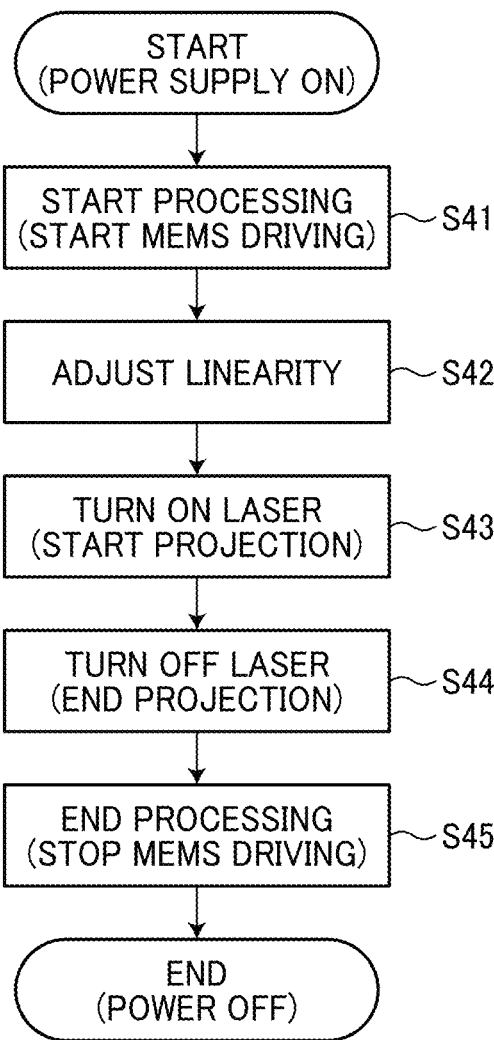
FIG. 24 is a flowchart of processing from power-on to power-off of the movable device according to an embodiment of the present disclosure.

FIG. 24 is a flowchart of processing from power-on to power-off of the movable device according to an embodiment of the present disclosure. The control device 11 performs initial setting after power-on (S41). The control device 11 sets a MEMS driving frequency and a predetermined amount of laser emission in the initial setting.

The control device 11 adjusts linearity (S42).

The control device 11 starts turning on a laser, using the MEMS drive setting in which the nonuniformity in brightness is not recognized (S43).

The control device 11 first turns off the laser in order to end the projecting process (S44).

The control device 11 stops the MEMS driving, stops the MEMS mirror, and turns off the power (S45).

Third Embodiment

Optical Deflection Apparatus

An optical deflection apparatus according to a third embodiment is described in detail below with reference to FIGS. 25 to 28. The optical deflection apparatus according to the third embodiment used the control system 1000 of the movable device 13 according to the first embodiment or the second embodiment.

Figure 25:
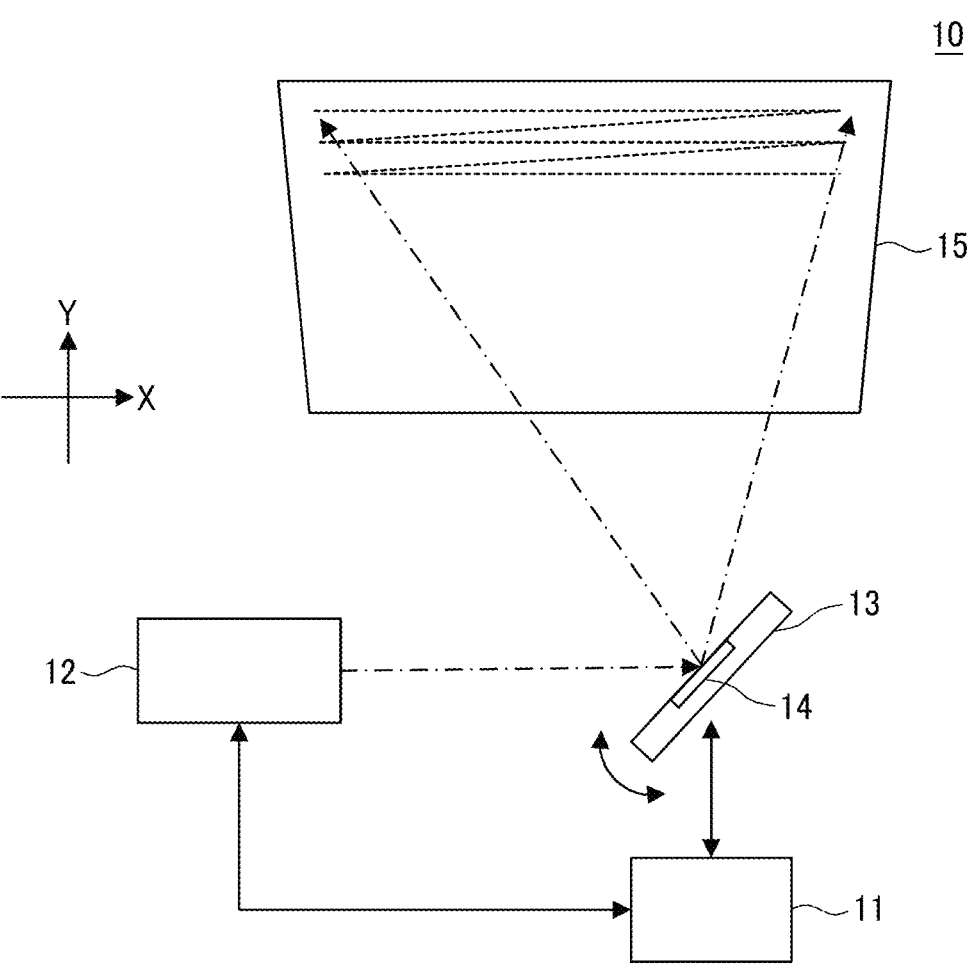
FIG. 25 is a diagram of an optical deflection apparatus according to an embodiment of the present disclosure.

FIG. 25 is a diagram of an optical deflection apparatus according to an embodiment of the present disclosure. As illustrated in FIG. 25, the optical deflection apparatus 10 includes a control device 11, a light-source device 12 as a light source, and a movable device 13 having a reflecting surface 14. The optical deflection apparatus 10 deflects light emitted from the light-source device 12 using the reflecting surface 14, under the control of the control device 11, thus optically scanning a scanning target surface 15.

For example, the control device 11 is an electronic circuit unit provided with a central processing unit (CPU) and a field-programmable gate array (FPGA). The movable device 13 is, for example, a micro electro mechanical systems (MEMS) device that incorporates a movable reflecting surface 14. The light-source device 12 is, for example, a laser device that emits a laser beam. The target surface 15 is, for example, a screen.

The control device 11 generates control instructions of the light-source device 12 and the movable device 13 based on acquired optical-scanning information, and outputs drive signals to the light-source device 12 and the movable device 13 based on the control instructions.

The light-source device 12 emits light based on the received drive signal. The movable device 13 moves the reflecting surface 14 in at least one of a uniaxial direction and a biaxial direction, based on the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired.

A hardware configuration of the optical deflection apparatus 10 is described below with reference to FIG. 26.

Figure 26:
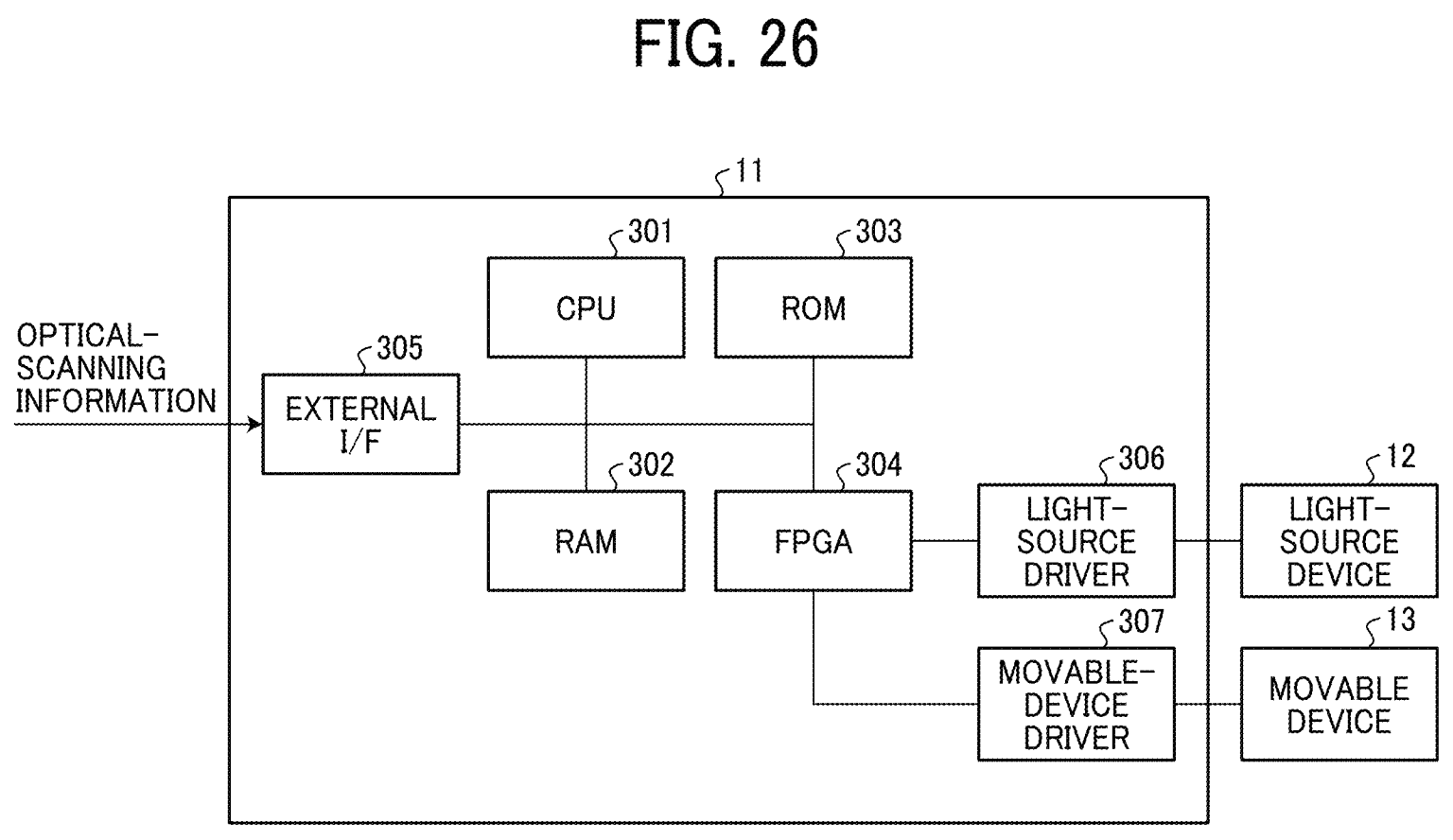

FIG. 26 is a hardware block diagram of a configuration of the optical deflection apparatus 10 according to an embodiment of the present disclosure. As illustrated in FIG. 26, the optical deflection apparatus 10 includes a control device 11, a light-source device 12, and a movable device 13, which are electrically connected to each other. The control device 11 includes a CPU 301, a random access memory (RAM) 302, a read only memory (ROM) 303, a FPGA 304, an external interface (I/F) 305, a light-source-device driver 306, and a movable-device driver 307.

The CPU 301 is an arithmetic device that loads into the RAM 302 a program or data from a storage device such as the ROM 303 and executes processing to provide the controls or functions of the entirety of the control device 11.

The RAM 302 is a volatile storage device that temporarily stores a program and data.

The ROM 303 is a non-volatile storage device that can hold a program and data even after the power is turned off, and stores a program and data for processing that is executed by the CPU 301 to control each function of the optical deflection apparatus 10.

The FPGA 304 is a circuit that outputs proper control signals to the light-source driver 306 and the movable-device driver 307 in accordance with the processing performed by the CPU 301.

The external I/F 305 is an interface with, for example, an external device and a network. The external device includes, for example, a host device such as a personal computer (PC); or a storage device, such as a universal serial bus (USB) memory, a secure digital (SD) card, a compact disk (CD), a digital versatile disk (DVD), a hard disk drive (HDD), or a solid state drive (SSD). For example, the network is a controller area network (CAN) of a vehicle, a local area network (LAN), and the Internet. The external I/F 305 has any configuration that can achieve connection to an external device or communication with an external device. Alternatively, the external I/F 305 is provided for each external device.

The light-source driver 25 is an electric circuit that outputs a drive signal such as a drive voltage to the light-source device 12 in accordance with the received control signal.

The movable-device driver 307 is an electric circuit that outputs a drive signal such as a drive voltage to the movable device 13 in accordance with the received control signal.

In the control device 11, the CPU 301 acquires optical-scanning information from an external device or a network through the external I/F 305. As far as the CPU 301 can acquire the optical-scanning information, the optical-scanning information may be stored in the ROM 303 or the FPGA 304 in the control device 11. Alternatively, a storage device such as an SSD is additionally provided in the control device 11, and the optical-scanning information is stored in the storage device.

In this case, the optical-scanning information indicates how the surface 15 is to be optically scanned. In another example, the optical-scanning information is image data used for optical scanning to display an image.

The functional configuration of the control device 11 of the optical deflection apparatus 10 is described below referring to FIG. 27.

Figure 27:
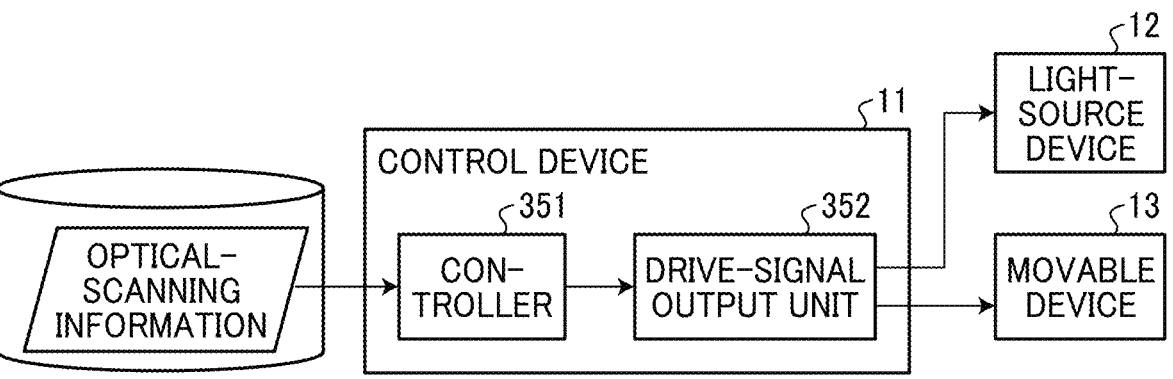
FIG. 27 is a functional block diagram of a control device of the optical deflection apparatus in FIG. 25.

FIG. 27 is a functional block diagram of a control device of the optical deflection apparatus according to an embodiment of the present disclosure. These functions are implemented by execution of a program by the CPU 301, hardware, or both.

As illustrated in FIG. 27, the control device 11 includes a control unit 351 and a drive signal output unit 352 as functional units.

The controller 351 is implemented by, for example, the CPU 301 and the FPGA 304. The controller 351 acquires optical-scanning information from an external device and converts the optical-scanning information into a control signal, outputting the control signal to the drive-signal output unit 352. For example, the controller 351 acquires image data serving as the optical-scanning information from an external device and generates a control signal from the image data through predetermined processing, outputting the control signal to the drive-signal output unit 352. The controller 351 also has the configuration of the first embodiment or the second embodiment. The control device 1 includes a drive signal generation unit A 211-1, a drive signal generation unit B 211-2, a high-frequency-component extraction unit 212, a memory 213, a setting-change counter unit 214-1, a setting calculation unit 214-2, and a high-frequency-component comparison unit 214-3.

The drive-signal output unit 352 is implemented by, for example, the light-source driver 306 and the movable-device driver 307. The drive-signal output unit 352 outputs a drive signal to the light-source device 12 or the movable device 13 in accordance with the received control signal. The movable-device driver 307 corresponds to the drive unit A 210-1 and the drive unit B 210-2.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal of the movable device 13 is a drive voltage used to control the timing at which the reflecting surface 14 included in the movable device 13 is moved and the movable range of the reflecting surface 14.

Figure 28:
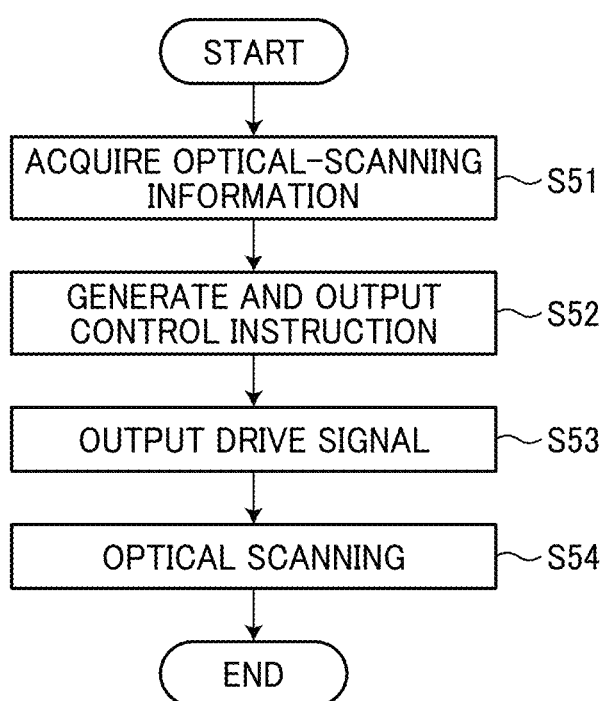
FIG. 28 is a flowchart of processing performed by the optical deflection apparatus in FIG. 25.

Processing for optically scanning the scanning target surface 15 by the optical deflection apparatus 10 is described below with reference to FIG. 28. FIG. 28 is a flowchart of processing performed by the optical deflection apparatus according to an embodiment of the present disclosure.

Firstly, the controller 351 obtains optical-scanning information from, for example, an external device (step S51).

The controller 351 generates a control signal from the obtained optical-scanning information and outputs the generated control signal to the drive-signal output unit 352 (step S52).

In step S53, the drive-signal output unit 352 outputs drive signals to the light-source device 12 and the movable device 13 based on the received control signals.

Subsequently, the light-source device 12 emits light based on the input drive signal, and the movable device 13 moves the reflecting surface 14 based on the input drive signal (S54). The driving of the light-source device 12 and the movable device 13 causes light to be deflected in a given direction to perform optical scanning.

In the above-described optical deflection apparatus 10, a single control device 11 has a device and a function for controlling the light-source device 12 and the movable device 13. However, a control device for the light source device and a control device for the movable device may be separate elements.

In the above-described optical deflection apparatus 10, a single control device 11 has the functions of the controller 351 and the functions of the drive-signal output unit 352 for the light-source device 12 and the movable device 13. These functions may be implemented by separate elements. For example, a drive-signal output device including a drive-signal output unit 352 may be provided in addition to the control device 11 including the controller 351. Alternatively, the above optical deflection apparatus 10 includes the movable device 13 including the reflecting surface 14 and the control device 11 to perform optical deflection.

Fourth Embodiment

Image Projection Apparatus

An image projection apparatus is descried in detail below with reference to FIGS. 29 and 30. The image projection apparatus is an apparatus that projects an image by optical scanning, and is, for example, a HUD. The optical deflection apparatus according to the third embodiment uses the control system 1000 of the movable device 13 according to the first embodiment or the second embodiment.

Figure 29:
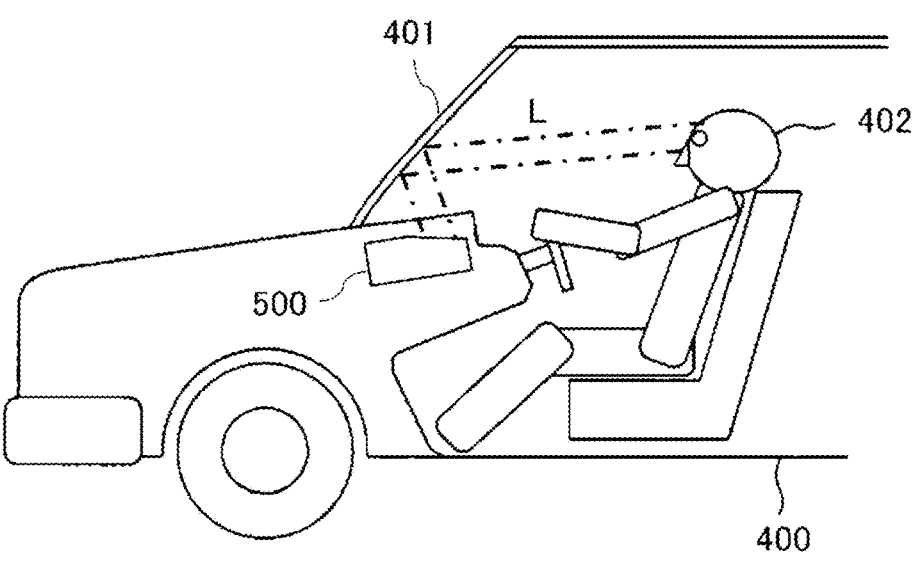
FIG. 29 is a diagram of a vehicle equipped with a head-up display as an example of an image projection apparatus according to an embodiment of the present disclosure.

FIG. 29 is a diagram of a vehicle 400 equipped with a HUD 500 serving as an image projection apparatus. FIG. 30 is a schematic view of the HUD 500 according to an embodiment of the present disclosure.

As illustrated in FIG. 29, for example, the HUD 500 is disposed, for example, near a windshield 401 of the vehicle 400. Projection light L that is emitted from the HUD 500 is reflected by the windshield 401 and directed to a viewer (a driver 402) as a user. Accordingly, the driver 402 can visually recognize an image projected by the HUD 500, as a virtual image. Alternatively, a combiner may be mounted on the inner wall surface of the windshield 401 to enable the driver 402 to recognize a virtual image formed by the projection light that is reflected by the combiner.

Figure 30:
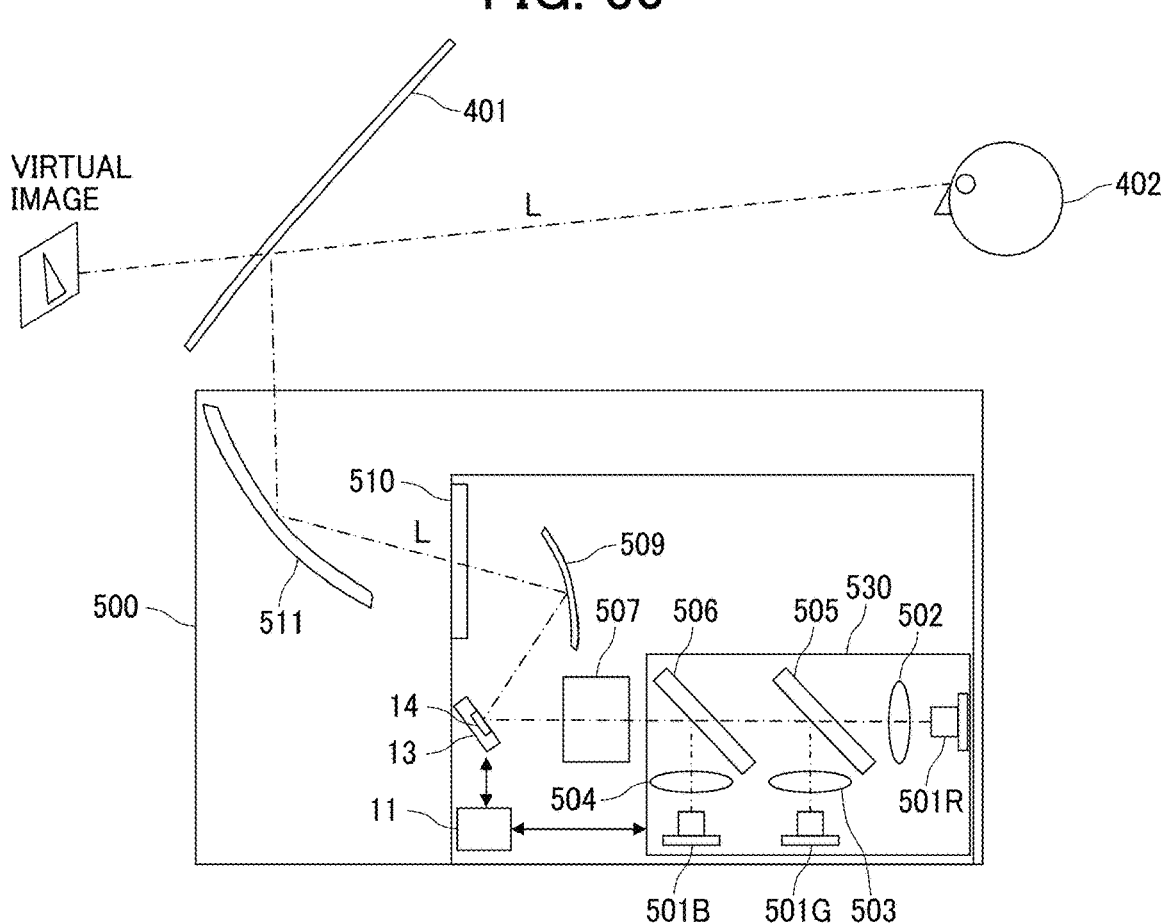
FIG. 30 is a diagram of the head-up display in FIG. 29.

As illustrated in FIG. 30, the HUD 500 emits laser beams having different wavelengths from red, green, and blue laser-beam sources 501R, 501G, and 501B (multiple light sources of a light source unit of the HUD 500), respectively. The emitted laser beams pass through an incident optical system, and then are deflected by the movable device 13 including the reflecting surface 14. The incidence optical system includes collimator lenses 502, 503, and 504 respectively provided for the laser-beam sources 501R. 501G, and 501B, two dichroic mirrors 505 and 506, and a light-intensity adjuster 507. The deflected laser beams pass through a projection optical system and are projected onto a screen. The projection optical system (an optical system, of the image projection apparatus) includes a free-form surface mirror 509, an intermediate screen 510, and a projection mirror 511. In the HUD 500, the laser-beam sources 501R, 501G, 501B, the collimator lenses 502, 503, 504, and the dichroic mirrors 505, 506 are combined as a single unit that is an optical housing serving as a light source unit 530 (a light source unit of the HUD 500).

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are collimated by the collimator lenses 502, 503, and 504 into approximately parallel beams, and are combined by the two dichroic mirrors 505 and 506. The light intensity of the combined laser beams is adjusted by the light-intensity adjuster 507, before being deflected for two-dimensionally scanning by the movable device 13 including the reflecting surface 14. The light L being deflected for two-dimensional scanning by the movable device 13 is reflected by the free-form surface mirror 509 and has its distortion corrected, thus being condensed on the intermediate screen 510. The intermediate screen 510 includes a microlens array in which microlenses are two-dimensionally arranged, and enlarges the projection light L incident on the intermediate screen 510 in units of microlens.

The movable device 13 causes the reflecting surface 14 to biaxially reciprocate and two-dimensionally scan with the light L incident on the reflecting surface 14. The movable device 13 is controlled in synchronization with the light-emitting timing of the laser-beam sources 501R, 501G, and 501B.

The HUD 500 is described above as the image projection apparatus. However, no limitation is indicated thereby, and the image projection apparatus may be any apparatus that performs optical scanning, using the movable device 13 including the reflecting surface 14, to project an image. For example, the present disclosure is also applicable to a projector that is placed on a desk and projects an image on a display screen, a head-mounted display device that is incorporated in a wearable member on the head of the observer, for example, and that projects an image on a reflective-and-transmissive screen of the wearable member or on an eyeball as a screen.

The image projection apparatus may be incorporated in, not only the vehicle or the wearable member, but also, for example, a mobile body such as an aircraft, a ship, or a mobile robot; or an immobile body such as an operation robot that operates a driving target such as a manipulator without moving from the installed location.

Fifth Embodiment

Head-Mounted Display

A head-mounted display is described below as the image projection apparatus with reference to FIGS. 31 and 32. The head-mounted display 60 is ahead-mounted display that can be mounted on a human head, and can be shaped like, for example, glasses. In the following description, such a head-mounted display may be referred to simply as a head-mounted display. The head-mounted display according to the fifth embodiment uses the control system 1000 of the movable device 13 according to the first embodiment or the second embodiment.

Figure 31:
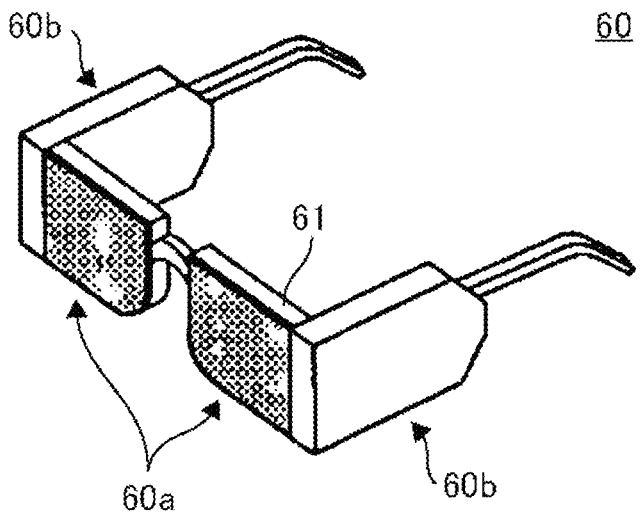
FIG. 31 is a perspective view illustrating of an appearance of a head-mounted display.

FIG. 31 is a perspective view of the appearance of the head-mounted display 60. In FIG. 31, the head-mounted display 60 includes a pair of a front part 60a and a temple 60b provided substantially symmetrically on each of the left and right. The front parts 60a each have alight guide plate 61. An optical system, a controller, and another component are incorporated in the temple 60b.

Figure 32:
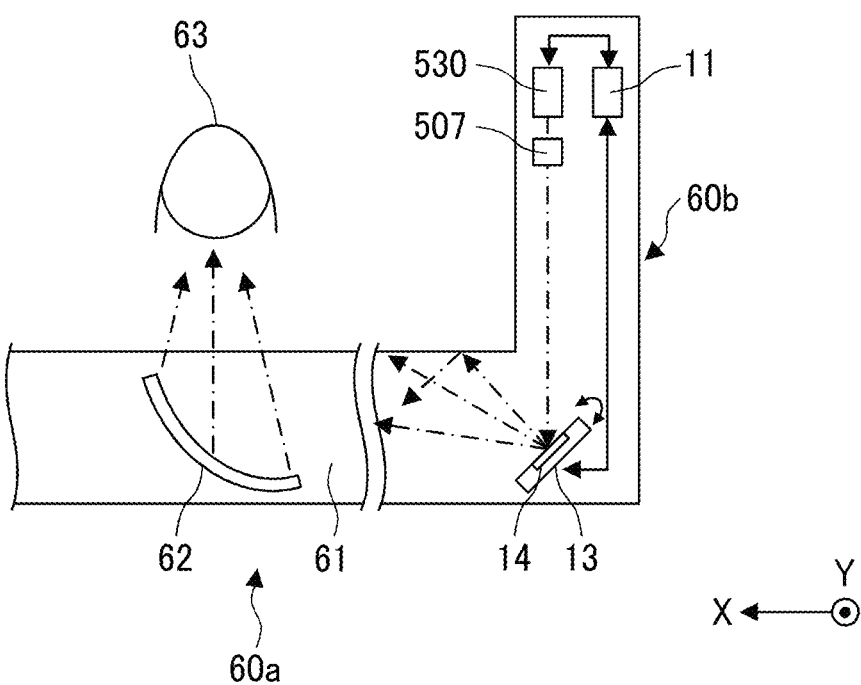
FIG. 32 is an illustration of a part of the configurations of the head-mounted display.

FIG. 32 is an illustration of a configuration of a part of the head-mounted display 60. Although the configuration for the left eye is illustrated in FIG. 32, the head-mounted display 60 has a configuration similar to that for the right eye.

The head-mounted display 60 includes a control device 11, a light source unit 530, a light-intensity adjuster 507, a movable device 13 including a reflecting surface 14, a light guide plate 61, and a semi-reflective mirror 62 as an image former.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R. 501G, and 501B are combined by the two dichroic mirrors 505 and 506. The combined parallel light is emitted from the light source unit 530.

The light intensity of the combined laser beams from the light source unit 530 is adjusted by the light-intensity adjuster 507. Then, the adjusted light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light by the movable device 13 is incident on the light guide plate 61. The light guide plate 61 reflects the scanning light on the inner wall and guides the scanning light to the semi-reflective mirror 62. The light guide plate 61 is formed from a material such as a resin having transparency at the wavelength of the scanning light.

The semi-reflective mirror 62 reflects the light guided through the light guide plate 61 to the back side of the HMD 60, emitting the light in the direction to an eye of a wearer 63 of the HMD 60. The semi-reflective mirror 62 has, for example, a free-form surface shape. An image formed of the scanning light is reflected by the semi-reflective mirror 62, thus being formed on the retina of wearer 63. Alternatively, the reflection at the semi-reflective mirror 62 and the effect of the crystalline lenses of eyeballs causes the image of the scanning light to be formed on the retina of the wearer 63. Moreover, due to the reflection at the semi-reflective mirror 62, the spatial distortion of the image is corrected. The wearer 63 can observe an image formed by the light of scanning in the XY direction.

As the semi-reflective mirror 62 is a semi-reflective mirror, the wearer 63 observes both an image formed by extraneous light and an image formed by scanning light in an overlapping manner. Alternatively, a mirror may be provided instead of the semi-reflective mirror 62 so that external light is blocked out and the wearer 63 observes only the image of the scanning light.

The embodiments described above are given as an example, and unique advantageous effects are achieved for each of the following aspects given below.
Aspect 1

A control system includes a movable device, a memory, and circuitry. The movable device includes a reflector; paired movable portions to tilt the reflector; and a detector to detect deflection angle of the reflector tilted by the paired movable portions. The circuitry is configured to: output drive signals to the paired movable portions, respectively, to cause the paired movable portions to individually tilt the reflector in accordance with the drive signals; generate the drive signals based on variables of a relation between a symmetry of a ratio of one of a time width of rising duration or a time width of falling duration to one cycle of each of the drive signals and a phase difference between the drive signals; detect, from the movable device, the deflection angle of the reflector by the detector; extract an amplitude of a high-frequency component from a detection signal detected by detecting the deflection angle of the reflector by the detector; store, in the memory, information in which the amplitude of the high-frequency component is associated with values of the variables of the drive signals; select a combination of the values of the variables based on the high-frequency component and the information stored in the memory; and update the drive signals based on the combination of the values of the variables selected.
Aspect 2

In the control system according to Aspect 1, the circuitry is further configured to: set multiple combinations of the values of the variables including the combination of the values of the variables; change one of the multiple combinations to another of the multiple combinations to acquire the amplitude of the high-frequency component for each of the multiple combinations; and select the combination of the values of the variables, at which the amplitude of the high-frequency component becomes the minimum, from the multiple combinations.
Aspect 3

In the control system according to Aspect 1, the multiple combinations are arranged in a two dimensional coordinate axis having a first axis direction indicating the phase difference and a second axis direction indicating the symmetry as multiple coordinate points, and the multiple coordinate points have: one of the multiple coordinate points at a center; and other of the multiple coordinate points surrounding the one of the multiple coordinate points at the center with equal interval.
Aspect 4

In the control system according to Aspect 3, the circuitry is further configured to: connect, with a first line, one of the multiple coordinate points with another of the multiple coordinate points adjacent to the one of the multiple coordinate points for each of the multiple coordinate points; obtain an internal division point of the first line connecting the multiple coordinate points adjacent to each other; and select, as the combination of the values of the variables, one of intersection points at which second lines connecting the internal division points including the internal division point intersect.
Aspect 5

In the control system according to Aspect 2, the circuitry is further configured to: read out, from the memory, the amplitude of the high-frequency components for each of the multiple combinations; calculate the combination of the values of the variables at which the amplitude of the high-frequency component becomes the minimum; and select, from the multiple combinations, the combination of the values of the variables calculated to have the minimum amplitude of the high-frequency component.
Aspect 6

An optical deflection apparatus includes: the control system according to Aspect 1; and a light source to emit light to the movable device. The movable device deflects the light emitted from the light source to form an image.
Aspect 7

An image projection apparatus includes; the control system according to Aspect 1; and a light source to emit light to the movable device; and a screen onto which an image of the light deflected by the movable device is projected.
Aspect 8

A mobile object comprising the image projection apparatus according to Aspect 7.
Aspect 9

A head-mounted display includes: the control system according to Aspect 1; a light source configured to emit light to the movable device; and an image former to form an image of the light deflected by the movable device on a retina of an object.

Lastly, the description of the above embodiments is given by way of example, and no limitation is intended thereby. Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. It is therefore to be understood that within the scope of the appended claims, the embodiments may be practiced otherwise than as specifically described herein. For example elements and/or features of different illustrative embodiments may be combined with each other and/or substituted for each other within the scope of this disclosure and appended claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A control system comprising:
a movable device including:
  a reflector;
  paired movable portions to tilt the reflector; and
  a detector to detect deflection angle of the reflector tilted by the paired movable portions;
a memory; and
circuitry configured to:
output drive signals to the paired movable portions, respectively, to cause the paired movable portions to individually tilt the reflector in accordance with the drive signals;
generate the drive signals based on variables of a relation between a symmetry of a ratio of one of a time width of rising duration or a time width of falling duration to one cycle of each of the drive signals and a phase difference between the drive signals;
detect, from the movable device, the deflection angle of the reflector by the detector;
extract an amplitude of an unwanted vibration from a detection signal detected by detecting the deflection angle of the reflector by the detector;
store, in the memory, information in which the amplitude of the unwanted vibration is associated with values of the variables of the drive signals; and set multiple combinations of the values of the variables;
change one of the multiple combinations to another of the multiple combinations to acquire the amplitude of the unwanted vibration for each of the multiple combinations; and
select a combination of the values of the variables, at which the amplitude of the unwanted vibration becomes a minimum, from the multiple combinations; and
update the drive signals based on the combination of the values of the variables selected.

2. The control system according to claim 1, wherein;
the multiple combinations are arranged in a two dimensional coordinate axis having a first axis direction indicating the phase difference and a second axis direction indicating the symmetry as multiple coordinate points, and
the multiple coordinate points have:
one of the multiple coordinate points at a center; and
a plurality of other of the multiple coordinate points surrounding the one of the multiple coordinate points at the center at equal intervals.

3. The control system according to claim 2, wherein the circuitry is further configured to:
connect, with a first line, one of the multiple coordinate points with another of the multiple coordinate points adjacent to the one of the multiple coordinate points for each of the multiple coordinate points;
obtain an internal division point of the first line connecting the multiple coordinate points adjacent to each other; and
select, as the combination of the values of the variables, one of intersection points at which second lines connecting the internal division points including the internal division point intersect.

4. The control system according to claim 2, wherein:
the multiple coordinate points surround the one of the multiple coordinate points at different intervals in the first axis direction and the second axis direction.

5. The control system according to claim 2, wherein the circuitry is further configured to:
set further multiple combinations of values surrounding a new center coordinate point corresponding to the selected combination of the values of the variables.

6. The control system according to claim 5, wherein:
the further multiple combinations are set with intervals that are half of the equal intervals of the multiple coordinate points.

7. The control system according to claim 1, wherein the circuitry is further configured to:
read out, from the memory, the amplitude of the unwanted vibration for each of the multiple combinations;
calculate the combination of the values of the variables at which the amplitude of the unwanted vibration becomes the minimum; and
select, from the multiple combinations, the combination of the values of the variables calculated to have a minimum amplitude of the unwanted vibration.

8. An optical deflection apparatus comprising:
the control system according to claim 1; and
a light source to emit light to the movable device,
wherein the movable device deflects the light emitted from the light source to form an image.

9. An image projection apparatus comprising:
the control system according to claim 1; and
a light source to emit light to the movable device; and a screen onto which an image of the light deflected by the movable device is projected.

10. A mobile object comprising the image projection apparatus according to claim 9.

11. The mobile object according to claim 10, wherein: the mobile object is a vehicle.

12. The image projection apparatus according to claim 9, wherein:
the image projection apparatus is a head-up display.

13. A head-mounted display comprising:
the control system according to claim 1;
a light source configured to emit light to the movable device; and
an image former to form an image of the light deflected by the movable device on a retina of an object.

14. The control system according to claim 1, wherein:
the detector is disposed inside a meander structure of the paired movable portions.

15. The control system according to claim 14, wherein:
the detector includes a plurality of detector portions arranged parallel to a plurality of piezoelectric drives of the paired movable portions.

16. The control system according to claim 1, wherein the circuitry is further configured to:

reset a counter and data stored in the memory after selecting the combination of the values of the variables at which the amplitude of the unwanted vibration becomes the minimum.

17. The control system according to claim 1, wherein the circuitry is further configured to:
determine whether the minimum amplitude of the unwanted vibration is less than a predetermined amplitude threshold.

18. The control system according to claim 17, wherein:
the circuitry is configured to end processing if the minimum amplitude of the unwanted vibration is less than the predetermined amplitude threshold.

19. The control system according to claim 1, further comprising:
a first driver to move the reflector around a first axis,
wherein the paired movable portions comprise a second driver to move the reflector around a second axis, the second axis being different from the first axis.

20. The control system according to claim 19, wherein:
the first driver comprises torsion bars.

\* \* \* \* \*